(12) United States Patent
Oyama et al.

(10) Patent No.: US 11,457,116 B2
(45) Date of Patent: Sep. 27, 2022

(54) IMAGE PROCESSING APPARATUS AND IMAGE READING METHOD

(71) Applicants: Tadaaki Oyama, Kanagawa (JP); Masamoto Nakazawa, Kanagawa (JP); Yuichiro Shukuya, Kanagawa (JP)

(72) Inventors: Tadaaki Oyama, Kanagawa (JP); Masamoto Nakazawa, Kanagawa (JP); Yuichiro Shukuya, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/338,683

(22) Filed: Jun. 4, 2021

(65) Prior Publication Data

US 2021/0400159 A1   Dec. 23, 2021

(30) Foreign Application Priority Data

Jun. 17, 2020   (JP) .............................. JP2020-104460

(51) Int. Cl.
  *H04N 1/00*   (2006.01)
(52) U.S. Cl.
  CPC . *H04N 1/00795* (2013.01); *H04N 2201/0081* (2013.01)
(58) Field of Classification Search
  CPC ........... H04N 1/00795; H04N 1/40056; H04N 1/486; H04N 2201/0081; H04N 5/332;
  (Continued)

(56) References Cited

U.S. PATENT DOCUMENTS

| | | | | |
|---|---|---|---|---|
| 5,742,279 A | * | 4/1998 | Yamamoto | ......... H04N 1/00129 345/173 |
| 6,094,281 A | * | 7/2000 | Nakai | .................... H04N 1/028 358/512 |

(Continued)

FOREIGN PATENT DOCUMENTS

| | | |
|---|---|---|
| EP | 3 609 170 A1 | 2/2020 |
| EP | 3 609 171 A1 | 2/2020 |

(Continued)

OTHER PUBLICATIONS

U.S. Appl. No. 16/952,103, filed Nov. 19, 2020, Tatsuya Ozaki, et al.

(Continued)

*Primary Examiner* — Negussie Worku
(74) *Attorney, Agent, or Firm* — Xsensus LLP

(57) ABSTRACT

An image processing apparatus includes an invisible light source configured to emit invisible light to a subject, a visible light source configured to emit visible light to the subject, an invisible image reading sensor configured to read invisible reflection light reflected from the subject and acquire an invisible image, and a visible image reading sensor configured to read visible reflection light reflected from the subject and acquire a visible image. The invisible reflection light is a part of the invisible light emitted from the invisible light source. The visible reflection light is a part of the visible light emitted from the visible light source. The image processing apparatus further includes circuitry configured to restore information lost in the invisible image acquired by the invisible image reading sensor.

20 Claims, 16 Drawing Sheets

(58) Field of Classification Search
CPC .. H04N 9/3194; H04N 13/239; H04N 13/344; H04N 13/366; H04N 5/2256; H04N 9/3185; H04N 5/33; H04N 9/3164; H04N 1/00037; H04N 1/0087; H04N 5/232; H04N 5/2354; H04N 9/04553; H04N 9/04555; H04N 9/04559; H04N 9/3155; H04N 9/3161; H04N 9/3179; H04N 9/3182; H04N 13/204; H04N 13/271; H04N 17/002; H04N 19/44; H04N 1/00082; H04N 1/00129; H04N 1/00241; H04N 1/00798; H04N 1/00854; H04N 1/02815; H04N 1/02885; H04N 1/0461; H04N 1/19515; H04N 1/40093; H04N 1/4097; H04N 1/6072; H04N 2201/0094; H04N 5/2226; H04N 5/2251; H04N 5/2254; H04N 5/2283; H04N 5/232122; H04N 5/232123; H04N 5/2352; H04N 5/3532; H04N 5/369; H04N 5/36961; H04N 5/374; H04N 5/74; H04N 5/7458; H04N 9/04515; H04N 9/07; H04N 9/3105; H04N 9/3111; H04N 9/3114; H04N 9/312; H04N 9/3147; H04N 9/3158; H04N 9/317; F21V 23/02; F21V 23/0471; F21V 33/0088; F21V 23/003; F21V 33/0004; F21V 33/0052; F21V 33/0056; F21V 33/006; F21V 3/08; F21V 9/08; F21V 9/30

USPC .............................................. 358/474

See application file for complete search history.

(56) References Cited

U.S. PATENT DOCUMENTS

| | | | | |
|---|---|---|---|---|
| 6,486,974 | B1* | 11/2002 | Nakai | H04N 1/486 358/1.9 |
| 6,970,259 | B1* | 11/2005 | Lunt | G06F 21/608 358/1.14 |
| 7,782,339 | B1* | 8/2010 | Hobbs | H04N 19/20 345/626 |
| 9,866,718 | B1* | 1/2018 | Itagaki | H04N 1/02835 |
| 10,924,621 | B2* | 2/2021 | Nakazawa | H04N 1/00846 |
| 2003/0081211 | A1* | 5/2003 | Nishio | H04N 1/4097 356/390 |
| 2005/0129436 | A1 | 6/2005 | Kohchi et al. | |
| 2005/0275909 | A1* | 12/2005 | Takayama | H04N 1/4097 358/509 |
| 2006/0082833 | A1 | 4/2006 | Shoda et al. | |
| 2007/0188638 | A1 | 8/2007 | Nakazawa et al. | |
| 2008/0252787 | A1 | 10/2008 | Nakazawa et al. | |
| 2010/0027061 | A1 | 2/2010 | Nakazawa | |
| 2010/0171998 | A1 | 7/2010 | Nakazawa | |
| 2011/0026083 | A1 | 2/2011 | Nakazawa | |
| 2011/0051201 | A1 | 3/2011 | Hashimoto et al. | |
| 2011/0063488 | A1 | 3/2011 | Nakazawa | |
| 2011/0249069 | A1 | 10/2011 | Oyama | |
| 2012/0033267 | A1 | 2/2012 | Yuuichiroh | |
| 2012/0075253 | A1* | 3/2012 | Tsai | G06F 3/0421 345/175 |
| 2012/0224205 | A1 | 9/2012 | Nakazawa | |
| 2012/0236373 | A1 | 9/2012 | Oyama | |
| 2013/0063792 | A1 | 3/2013 | Nakazawa | |
| 2014/0029065 | A1 | 1/2014 | Nakazawa | |
| 2014/0204427 | A1 | 7/2014 | Nakazawa | |
| 2014/0204432 | A1 | 7/2014 | Hashimoto et al. | |
| 2014/0211273 | A1 | 7/2014 | Konno et al. | |
| 2014/0368893 | A1 | 12/2014 | Nakazawa et al. | |
| 2015/0098117 | A1 | 4/2015 | Marumoto et al. | |
| 2015/0116794 | A1 | 4/2015 | Nakazawa | |
| 2015/0163378 | A1 | 6/2015 | Konno et al. | |
| 2015/0222790 | A1 | 8/2015 | Asaba et al. | |
| 2015/0249762 | A1 | 9/2015 | Ishida et al. | |
| 2015/0304517 | A1 | 10/2015 | Nakazawa et al. | |
| 2016/0003673 | A1 | 1/2016 | Hashimoto et al. | |
| 2016/0006961 | A1 | 1/2016 | Asaba et al. | |
| 2016/0018774 | A1 | 1/2016 | Abe et al. | |
| 2016/0088179 | A1* | 3/2016 | Nakazawa | H04N 5/3692 358/482 |
| 2016/0112660 | A1 | 4/2016 | Nakazawa et al. | |
| 2016/0119495 | A1 | 4/2016 | Konno et al. | |
| 2016/0173719 | A1 | 6/2016 | Hashimoto et al. | |
| 2016/0268330 | A1 | 9/2016 | Nakazawa et al. | |
| 2016/0295138 | A1 | 10/2016 | Asaba et al. | |
| 2016/0373604 | A1 | 12/2016 | Hashimoto et al. | |
| 2017/0019567 | A1 | 1/2017 | Konno et al. | |
| 2017/0163836 | A1 | 6/2017 | Nakazawa | |
| 2017/0170225 | A1 | 6/2017 | Asaba et al. | |
| 2017/0201700 | A1 | 7/2017 | Hashimoto et al. | |
| 2017/0295298 | A1 | 10/2017 | Ozaki et al. | |
| 2017/0302821 | A1* | 10/2017 | Sasa | H04N 1/4076 |
| 2017/0324883 | A1 | 11/2017 | Konno et al. | |
| 2018/0103172 | A1* | 4/2018 | Itagaki | H04N 1/02835 |
| 2018/0146150 | A1 | 5/2018 | Shirado et al. | |
| 2018/0175096 | A1 | 6/2018 | Inoue et al. | |
| 2018/0213124 | A1 | 7/2018 | Yokohama et al. | |
| 2018/0261642 | A1 | 9/2018 | Asaba et al. | |
| 2019/0163112 | A1 | 5/2019 | Nikaku et al. | |
| 2019/0208149 | A1 | 7/2019 | Asaba et al. | |
| 2019/0238702 | A1 | 8/2019 | Ikemoto et al. | |
| 2019/0268496 | A1 | 8/2019 | Nakazawa et al. | |
| 2019/0289163 | A1 | 9/2019 | Hashimoto et al. | |
| 2019/0327387 | A1 | 10/2019 | Hashimoto et al. | |
| 2019/0335061 | A1 | 10/2019 | Nakazawa et al. | |
| 2020/0053229 | A1* | 2/2020 | Hashimoto | H04N 1/0087 |
| 2020/0053230 | A1 | 2/2020 | Nakazawa et al. | |
| 2020/0053233 | A1 | 2/2020 | Nakazawa et al. | |
| 2020/0120224 | A1 | 4/2020 | Sasa et al. | |
| 2020/0120225 | A1* | 4/2020 | Oyama | H04N 1/00681 |
| 2020/0120228 | A1 | 4/2020 | Ozaki et al. | |
| 2020/0410271 | A1 | 12/2020 | Nakazawa et al. | |
| 2020/0412904 | A1 | 12/2020 | Ohmiya et al. | |
| 2021/0014441 | A1 | 1/2021 | Ohmiya et al. | |
| 2021/0021729 | A1* | 1/2021 | Hashimoto | H04N 1/02895 |
| 2021/0409566 | A1* | 12/2021 | Hashimoto | H04N 1/00082 |

FOREIGN PATENT DOCUMENTS

| | | |
|---|---|---|
| JP | 2000-322510 | 11/2000 |
| JP | 2001-216469 | 8/2001 |
| JP | 2005-156638 | 6/2005 |
| JP | 2005-159392 | 6/2005 |
| JP | 2006-121674 | 5/2006 |

OTHER PUBLICATIONS

U.S. Appl. No. 17/181,704, filed Jan. 29, 2021, Shogo Nakamura, et al.

Extended European Search Report dated Nov. 9, 2021 in European Patent Application No. 21179214.8, 11 pages.

* cited by examiner

TXT1
(COMPOSITE OF COLOR INKS)

BLACK TEXT
(BLACK TONER)

PAPER: PALE BLUE
(CYAN TONER)

IMAGE PROCESSING APPARATUS AND IMAGE READING METHOD

CROSS-REFERENCE TO RELATED APPLICATION

This patent application is based on and claims priority pursuant to 35 U.S.C. § 119(a) to Japanese Patent Application No. 2020-104460, filed on Jun. 17, 2020, in the Japan Patent Office, the entire disclosure of which is hereby incorporated by reference herein.

BACKGROUND

Technical Field

Embodiments of the present disclosure generally relate to an image processing apparatus and a method for reading an image.

Related Art

Conventionally, there are technologies of reading an image with invisible light. Such technologies are used for extracting invisible information embedded in a document with a particular color material or component and improving the legibility of the document and the accuracy of optical character recognition/reader (OCR).

Further, there is an image processing technology for performing a predetermined image correction based on brightness information and color information of each image area. Such a technology is aimed at obtaining a good-quality monochrome image, without deteriorations in image quality from a color image document, so that the recognition rate of OCR can also improve.

SUMMARY

An embodiment of the present disclosure provides an image processing apparatus that includes an invisible light source configured to emit invisible light to a subject, a visible light source configured to emit visible light to the subject, an invisible image reading sensor configured to read invisible reflection light reflected from the subject and acquire an invisible image, and a visible image reading sensor configured to read visible reflection light reflected from the subject and acquire a visible image. The invisible reflection light is a part of the invisible light emitted from the invisible light source. The visible reflection light is a part of the visible light emitted from the visible light source. The image processing apparatus further includes circuitry configured to restore information lost in the invisible image acquired by the invisible image reading sensor.

Another embodiment provides a method for reading an image. The method includes reading invisible reflection light reflected from a subject to acquire an invisible image, reading visible reflection light reflected from the subject to acquire a visible image, and restoring information lost in the invisible image. The invisible reflection light is a part of invisible light emitted from an invisible light source. The visible reflection light is a part of visible light emitted from a visible light source.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
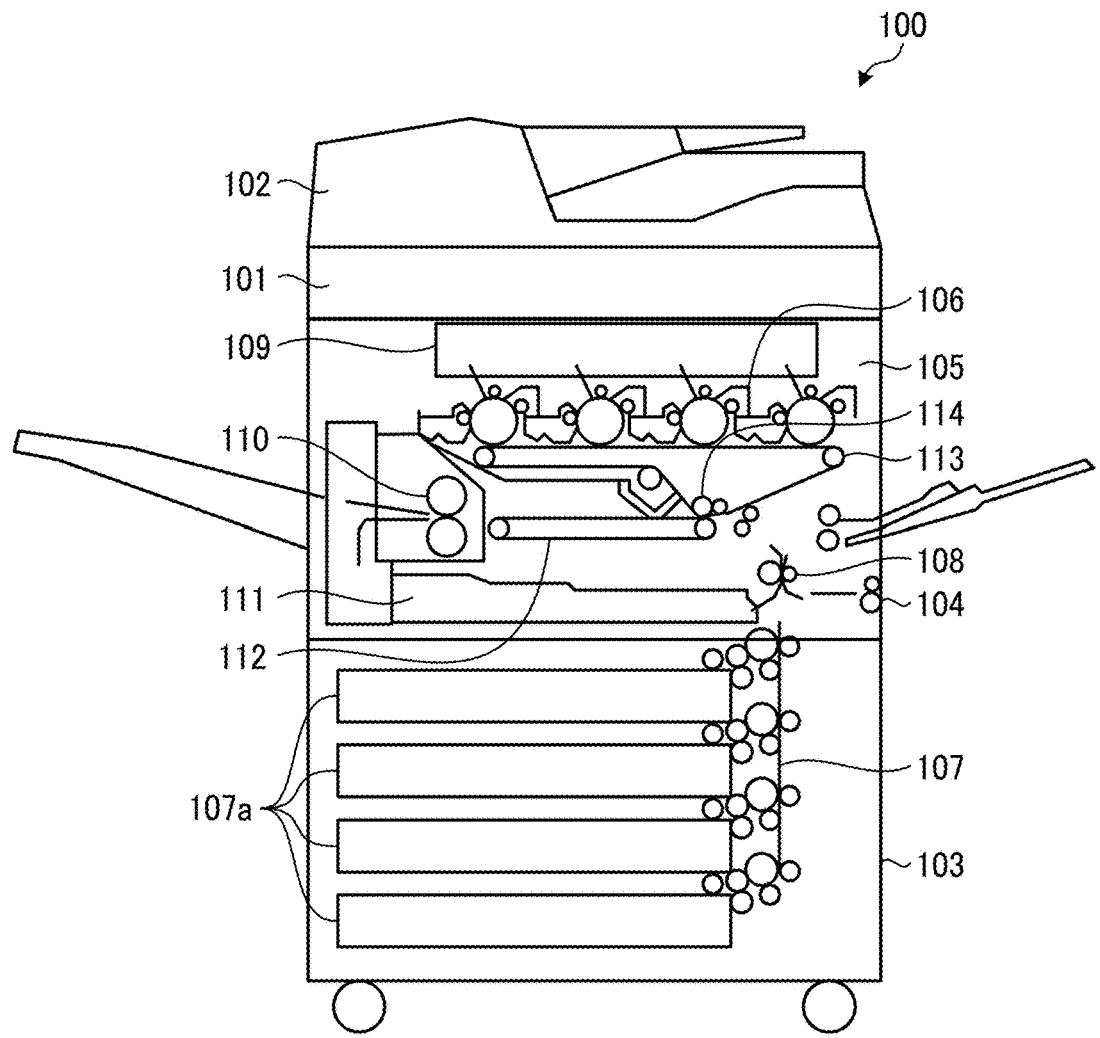
FIG. 1 is a view illustrating an example of a configuration of an image forming apparatus common to embodiments according to the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

According to embodiments of the present disclosure described below, in removing unnecessary information (e.g., a stamp mark imprinted on a text) from read information of a document, only unnecessary information can be removed, and missing of a character) or an image (e.g., a portion of a text overlapped with the stamp mark) can be prevented.

Hereinafter, descriptions are given below in detail of an image processing apparatus and an image reading method according to embodiments of the present disclosure, with reference to the accompanying drawings.

A first embodiment is described. FIG. 1 is a view illustrating an example of a configuration of an image forming apparatus 100 common to embodiments according to the present disclosure. In FIG. 1, the image forming apparatus 100 is an apparatus generally referred to as a multifunction peripheral having at least two of a copy function, a printer function, a scanner function, and a facsimile function.

The image forming apparatus 100 includes a scanner 101 serving as a reading device as well as an image processing apparatus, an automatic document feeder (ADF) 102, and an image forming device 103 below the scanner 101. In order to describe an internal configuration of the image forming device 103, FIG. 1 illustrates the internal configuration of the image forming device 103 from which an external cover is removed.

The ADF 102 is a document supporter that positions, at a reading position, a document containing an image to be read. The ADF 102 automatically feeds the document placed on a placement table to the reading position. The scanner 101 reads the document conveyed by the ADF 102 at a predetermined reading position. The scanner 101 includes, on the top, an exposure glass that is the document supporter, on which a document is placed, and reads the document on the exposure glass that is the reading position. Specifically, the scanner 101 includes a light source, an optical system, and a solid-state image sensing device such as a complementary metal oxide semiconductor (CMOS) image sensor inside. The scanner 101 reads, with the solid-state image sensing device through the optical system, light reflected from the document irradiated with light from the light source.

The image forming device 103 includes a bypass feeding roller pair 104 that feeds a recording sheet, and a recording sheet feeder 107 that feeds the recording sheet. The recording sheet feeder 107 includes a mechanism for feeding out the recording sheet from multi-stage recording sheet feeding trays 107a. The recording sheet thus fed is sent to a secondary transfer belt 112 via a registration roller pair 108.

Onto the recording sheet conveyed on the secondary transfer belt 112, a transfer device 114 transfers a toner image from an intermediate transfer belt 113.

The image forming device 103 further includes an optical writing device 109, a tandem image forming unit 105 for yellow (Y), magenta (M), cyan (C), and black (K), the intermediate transfer belt 113, and the secondary transfer belt 112. Specifically, in an image forming process, the image forming unit 105 forms an image written by the optical writing device 109 as a toner image on the intermediate transfer belt 113.

Specifically, the image forming unit 105 for Y, M, C, and K includes four rotatable photoconductor drums (respectively for Y, M, C, and K) and image forming elements 106 including a charging roller, a developing device, a primary transfer roller, a cleaner unit, and a discharger. The image forming elements 106 are disposed around the each of the photoconductor drums. As the image forming element 106 operates on each photoconductor drum, the image on the photoconductor drum is transferred onto the intermediate transfer belt 113 by each primary transfer roller.

The intermediate transfer belt 113 is stretched by a drive roller and a driven roller and in a nip between each photoconductor drum and each primary transfer roller. The toner image primarily transferred onto the intermediate transfer belt 113 is secondarily transferred onto the recording sheet on the secondary transfer belt 112 by a secondary transfer device as the intermediate transfer belt 113 runs. The recording sheet is conveyed to a fixing device 110 as the secondary transfer belt 112 travels, and the toner image is fixed as a color image on the recording sheet. Then, the recording sheet is ejected onto an output tray disposed outside a housing of the image forming apparatus 100. In duplex printing, a reverse assembly 111 reverses the recording sheet upside down and sends the reversed recording sheet onto the secondary transfer belt 112.

The image forming device 103 is not limited to the one that forms an image by an electrophotographic method as described above. The image forming device 103 may be one that forms an image by an inkjet method.

Next, the scanner 101 will be described.

Figure 2:
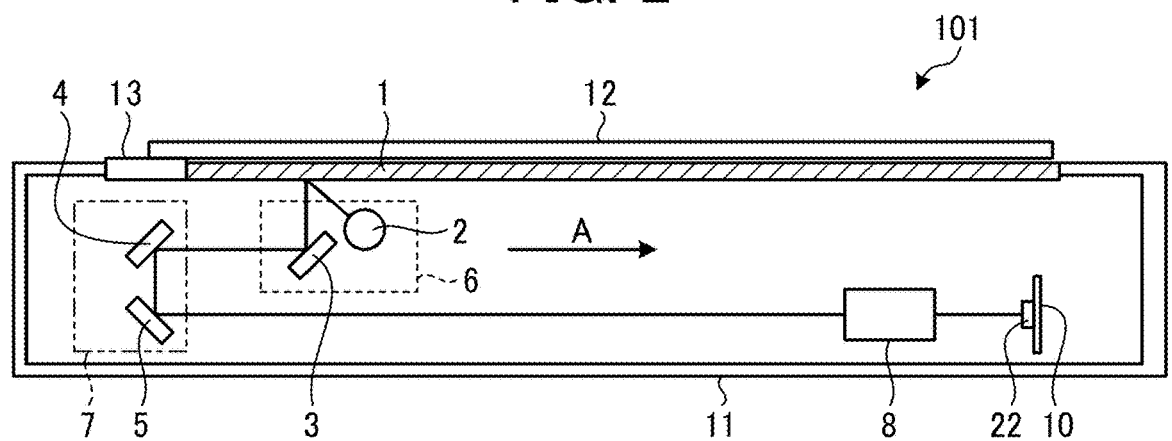
FIG. 2 is a cross-sectional view schematically illustrating an example of a structure of a scanner according to a first embodiment.

FIG. 2 is a cross-sectional view schematically illustrating a structure of the scanner 101. As illustrated in FIG. 2, the scanner 101 includes, in a housing 11, a sensor board 10 on which an imaging device 22 is mounted, a lens unit 8, a first carriage 6, and a second carriage 7. The imaging device 22 is a solid-state image sensing device in one example. The first carriage 6 includes a light source 2, which is a light emitting diode (LED), and a mirror 3. The second carriage 7 includes mirrors 4 and 5. Further, the scanner 101 includes an exposure glass 1 on the top side thereof. A document 12 is placed on the exposure glass 1.

Figure 4:
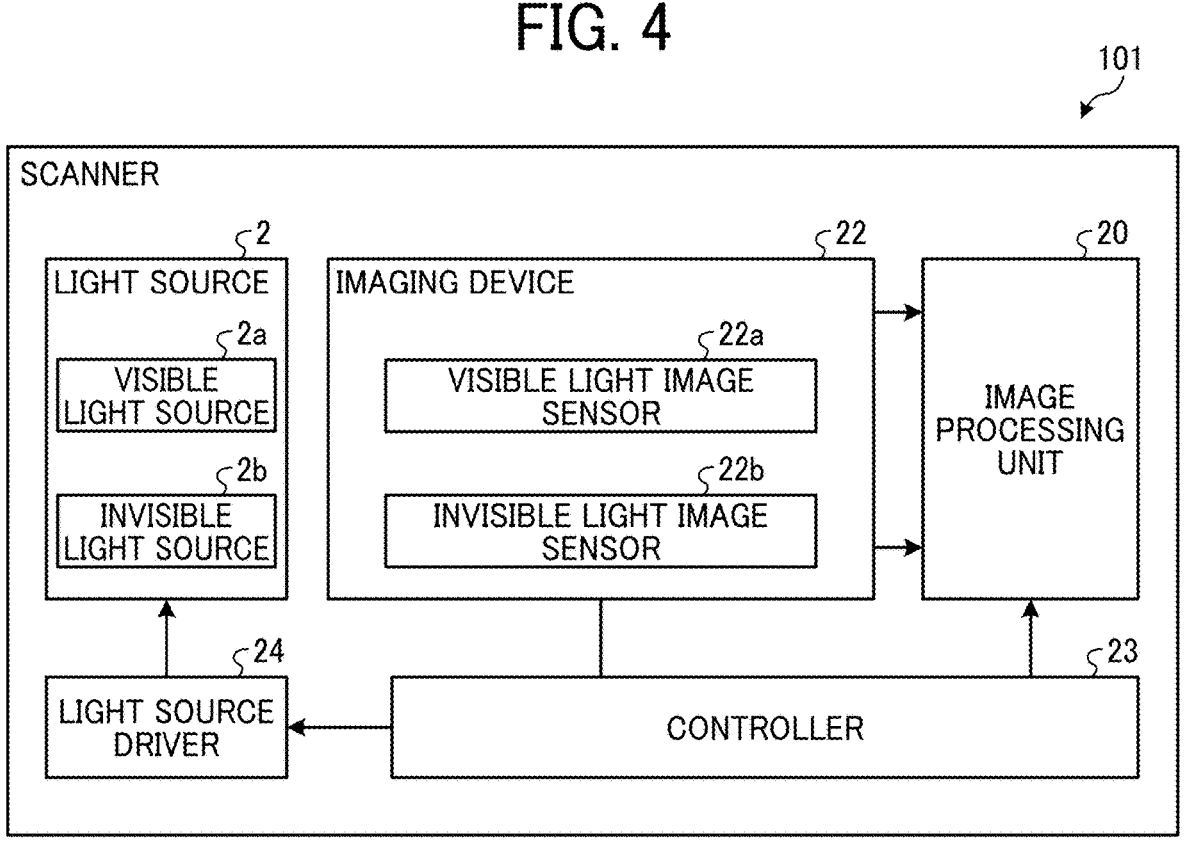
FIG. 4 is a block diagram illustrating an electrical connection of components of the scanner illustrated in FIG. 2.

The light source 2 includes a visible light source 2a and an invisible light source 2b as illustrated in FIG. 4. The visible light source 2a emits visible light to a subject and a reference white plate 13. The invisible light source 2b emits invisible light to a subject. Use of an infrared light source as the invisible light source 2b is effective. Generally, the visible light wavelength range is 380 to 780 nm, and the wavelength range greater than 780 nm is an infrared wavelength range, which is an invisible wavelength range.

Figure 3:
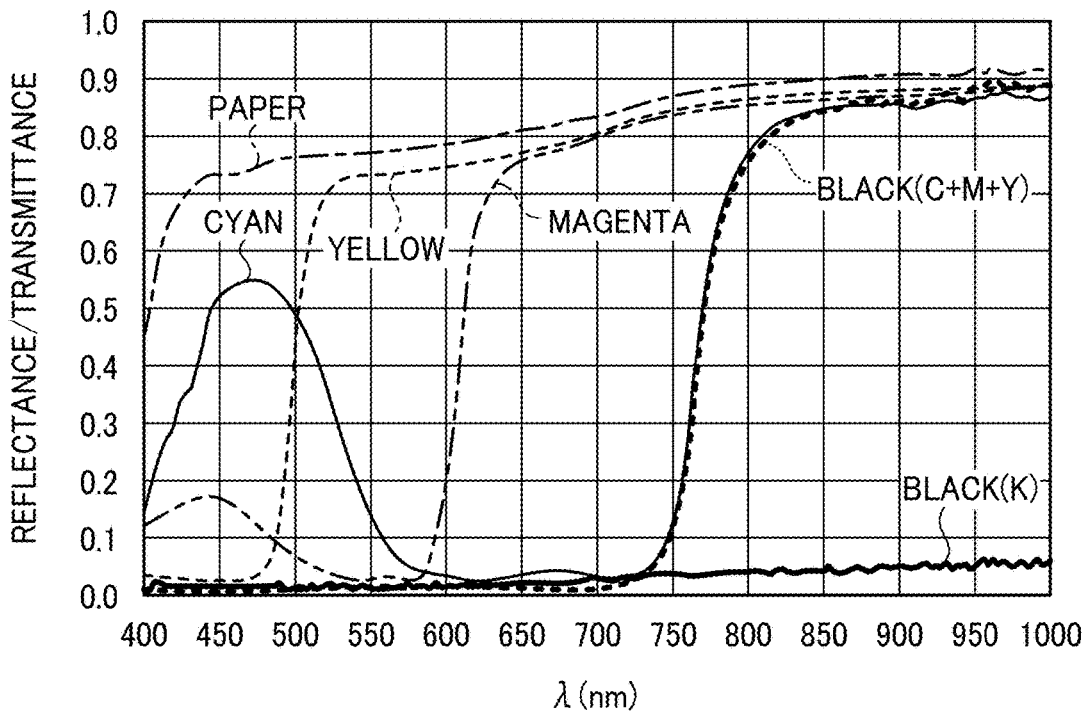
FIG. 3 is a graph illustrating an example of spectral properties of plain paper and color toner images.

FIG. 3 is a graph illustrating an example of spectral properties of white plain paper and color toner images. As illustrated in FIG. 3, both of a black image formed with black (K) toner (hereinafter "black (K) image") and a black image formed with a composite of cyan, magenta, and yellow (CMY) toners (hereinafter "black (CMY) image") have a low reflectance in the visible light range and are recognized as the same "black" images. However, there is a large difference in reflectance in the infrared light range. In particular, the latter black image is recognized as almost a "white" image and disappears when read as image information.

Since both are black in the visible light wavelength range, it is difficult for human eyes to distinguish a black (K) image and a black (CMY) image before scanned as images. Therefore, whether or not the two image information is lost in infrared light (also "infrared ray") reading is not determinable with human eyes, and unintended loss of information occurs.

Therefore, the present embodiment provides an image processing apparatus that employs an infrared light source as the invisible light source 2b for reading a subject, thereby enabling both of erasing unnecessary information and restoring lost image information.

Further, the scanner 101 includes the reference white plate 13 on the upper side thereof. More specifically, the reference white plate 13 is disposed on the side opposite to the light source 2 with respect to the subject, in an image capture range of the imaging device 22.

In the reading operation, the scanner 101 emits light from the light source 2 upward while moving the first carriage 6 and the second carriage 7 from the standby positions (home positions) in the sub-scanning direction (indicated by arrow A in FIG. 2). The first carriage 6 and the second carriage 7 cause reflected light from the document 12 (i.e., the subject) to be imaged on the imaging device 22 via the lens unit 8.

Further, the scanner 101 reads the reflected light from the reference white plate 13 to set a reference when the power is turned on or the like. That is, the scanner 101 moves the first carriage 6 directly below the reference white plate 13, turns on the light source 2, and causes the reflected light from the reference white plate 13 to be imaged on the imaging device 22, thereby adjusting the gain.

The imaging device 22 can capture images in the visible and invisible wavelength ranges. In the imaging device 22, pixels that convert incident light level into electric signals are arranged. The pixels are arranged in a matrix. Each pixel is provided with a color filter that transmits light having a specific wavelength. In the imaging device 22 according to the present embodiment, a channel refers to a signal obtained from a group of pixels each of which is provided with the same color filter. In addition, in the present embodiment, a visible image refers to an image captured by the imaging device 22 by irradiation of visible light, and an invisible image refers to an image captured by the imaging device 22 by irradiation of invisible light such as near-infrared ray.

Although the scanner 101 of the present embodiment employs a reduction optical system, the structure of the image reading sensor according to the present disclosure is not limited thereto. For example, a no-magnification optical system, such as a contact optical system or an image sensor (CIS) system may be used.

FIG. 4 is a block diagram illustrating an electrical connection of components of the scanner 101. As illustrated in FIG. 4, the scanner 101 includes, in addition to the imaging device 22 and the light source 2 described above, an image processing unit 20, a controller 23, and a light source driver 24. The controller 23, which may be implemented by a processor such as a central processing unit (CPU) that operates according a program stored in a memory, controls the imaging device 22, the image processing unit 20, and the light source driver 24. The light source driver 24 drives the light source 2 under control of the controller 23. The imaging device 22 transfers the signal to the image processing unit 20 on the subsequent stage.

The imaging device 22 includes an invisible light image sensor 22b, serving as an invisible image reading sensor, and a visible light image sensor 22a, serving as a visible image reading sensor. The invisible light image sensor 22b reads the invisible reflection light (a part of invisible light) reflected from the subject, thereby acquiring an invisible image (an image in the invisible light wavelength range). The visible light image sensor 22a reads visible reflection light (a part of visible light) reflected from a subject, thereby acquiring a visible image (an image in the visible light wavelength range). The invisible light image sensor 22b and the visible light image sensor 22a are sensors for a reduction optical system, such as a complementary metal oxide semiconductor (CMOS) image sensor.

Figure 5:
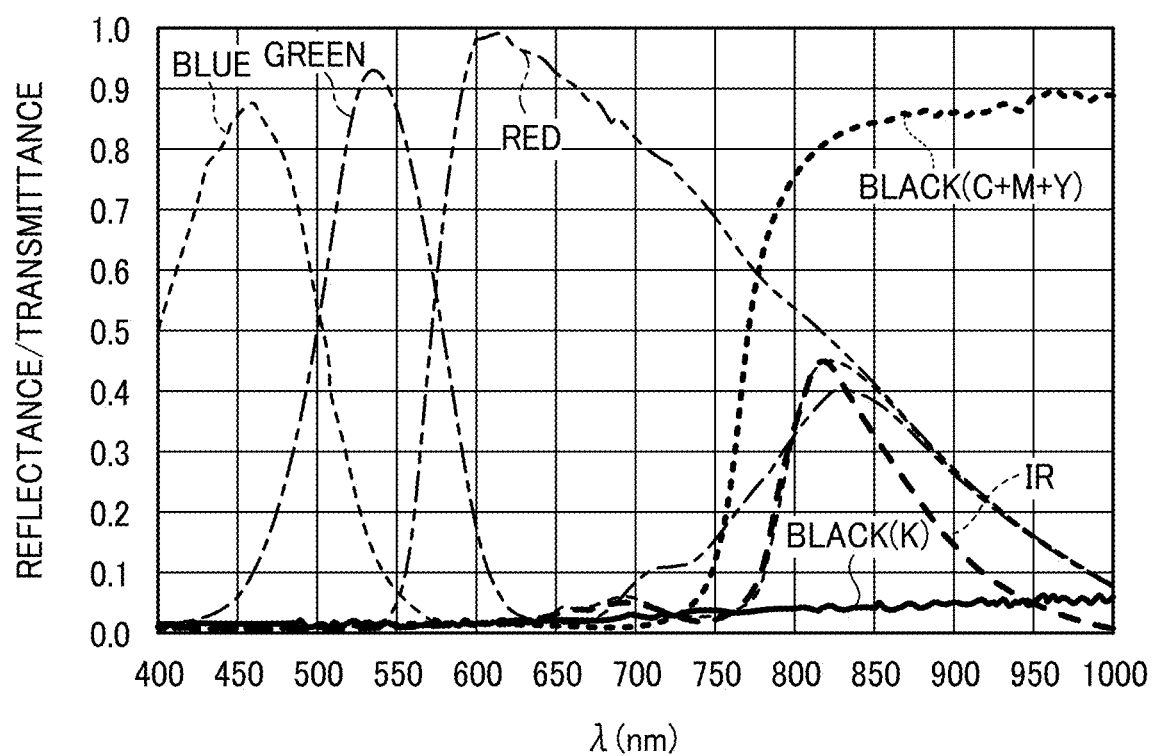
FIG. 5 is a graph illustrating an example of spectral sensitivity properties of an imaging device illustrated in FIG. 4.

FIG. 5 is a graph of spectral sensitivity characteristics of the imaging device 22. As illustrated in FIG. 5, the visible light image sensor 22a of the imaging device 22 has spectral sensitivity in each visible wavelength range of blue, green, and red. The invisible light image sensor 22b of the imaging device 22 has sensitivity only in the infrared (IR) light wavelength range greater than 780 nm. With such a configuration, when the light source 2 (the visible light source 2a and the invisible light source 2b) simultaneously emits invisible light and infrared light, the imaging device 22 can acquire both images in one-time reading of the subject. That is, such a configuration obviates the need to separate the irradiation light for each image sensor and can simplify the configuration. Note that the infrared light information is mixed in the R, G, and B pixels of the visible light image sensor 22a but can be removed from the respective read data by using the image data of the infrared light pixels.

The visible light image sensor 22a and the invisible light image sensor 22b may be integral with each other. Such a configuration can make the sensor structure compact and the reading positions of visible light and infrared light closer to each other. Accordingly, lost information can be extracted and restored with high accuracy. That is, such a configuration can eliminate deviations of the image, which may occur when the image is read a plurality of times, and correction can be made with high position accuracy.

The image processing unit 20 performs various types of image processing on image data according to a purpose of use. Note that the image processing unit 20 can be implemented by either hardware or software.

Figure 6:
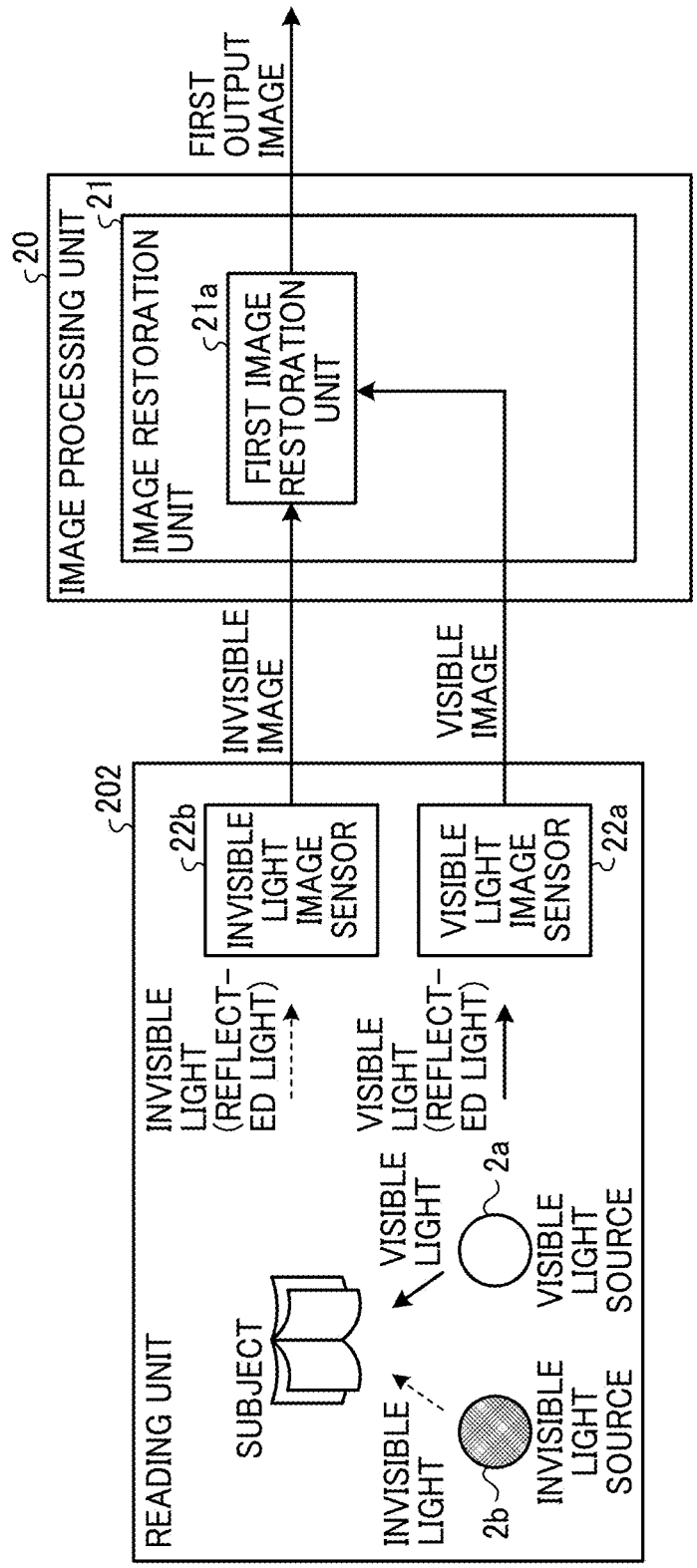
FIG. 6 is a block diagram illustrating an example of a functional configuration of an image processing unit according to the first embodiment.

FIG. 6 is a block diagram illustrating an example of a functional configuration of the image processing unit 20. In FIG. 6, a reading unit 202 of the scanner 101 includes the visible light source 2a, the invisible light source 2b, the visible light image sensor 22a, and the invisible light image sensor 22b. As illustrated in FIG. 6, the image processing unit 20 includes an image restoration unit 21. For example, in the present embodiment, first, the invisible light image sensor 22b reads an image with the invisible light emitted from the invisible light source 2b. Invisible light is transmitted through information that does not contain a specific component (e.g., color information). Accordingly, based on an invisible image in which only necessary information, such as black (carbon) information, is read as an image, a color background pattern or color ruled lines can be removed, so as to improve legibility and OCR accuracy. However, on the other hand, there are cases where even the information that is to be retained (e.g., color information) is unintentionally removed.

Therefore, in the present embodiment, the visible light image sensor 22a performs image reading by the visible light emitted from the visible light source 2a, and the image restoration unit 21 restores the information lost in the invisible image acquired by the invisible light image sensor 22b based on the visible image.

More specifically, as illustrated in FIG. 6, the image restoration unit 21 includes a first image restoration unit 21a. The first image restoration unit 21a corrects and restores the image information of the invisible image using the visible image read by the visible light image sensor 22a. By performing such an image restoration process, the first image restoration unit 21a generates a first output image.

The image restoration process executed by the image restoration unit 21 are described in detail below.

Figure 7A:
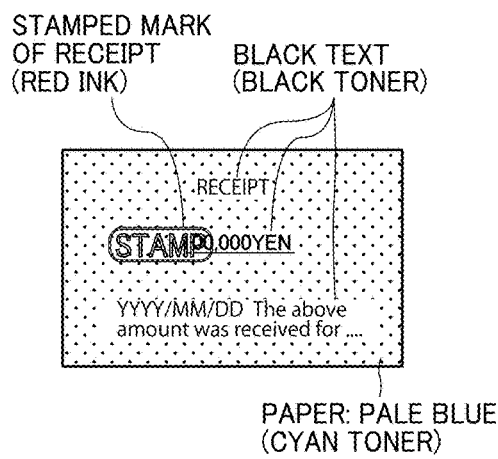
FIGS. 7A to 7G are diagrams illustrating an example of an image restoration process according to the first embodiment.

FIGS. 7A to 7G are diagrams illustrating an example of the image restoration process. FIG. 7A illustrates an example of a paper document printed on paper having a color (pale blue, etc.) background pattern. Specifically, characters (text) representing a date and an amount of money are printed with black toner containing a specific component such as carbon, and a receipt mark is stamped with red ink.

Figure 7B:
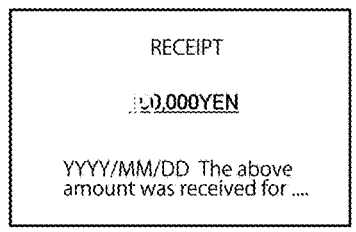

FIG. 7B illustrates a color dropout image of the document illustrated in FIG. 7A. For scanning a document on order to extract text information by OCR, preferably, the background pattern and the receipt stamp are removed. For example, when such color information is removed by a conventional color dropout process, as illustrated in FIG. 7B, the background pattern is removed cleanly, but the text is lost in the portion (representing the amount of money) superimposed by the receipt stamp.

Figure 7C:
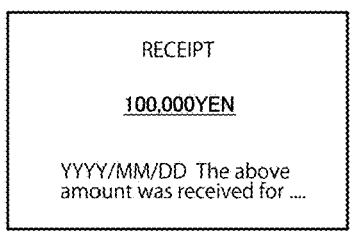

FIG. 7C illustrates an invisible image of the document illustrated in FIG. 7A. In contrast to the image reading by visible light, in image reading by invisible light emitted from the invisible light source 2b, the invisible light is transmitted through both the background pattern and the receipt mark that are made of materials free of the specific component. As a result, black text information can be read accurately as illustrated in FIG. 7C.

On the other hand, there are following cases. Although some information is written in black similar to important information such as numbers, the black is made of a material free of the specific component such as carbon, and invisible light is transmitted through such information. As a result, the information (e.g., color information) to be retained is unintentionally deleted.

Figure 7D:
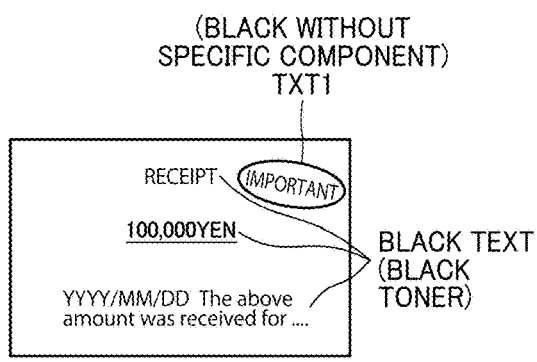

The document illustrated in FIG. 7D is an example of a paper document in which a text1 representing "important" is added to the receipt printed with black toner. The text TXT1 representing "important" is handwritten with a black material that is different from black toner and does not contain the specific component. The text TXT1 representing "important" is information indicating the importance and priority of the document, and disappearance is not desirable.

Figure 7E:
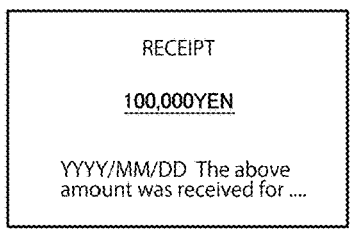

FIG. 7E illustrates an invisible image of the document illustrated in FIG. 7D. In the image reading with invisible light emitted from the invisible light source 2b, the text TXT1 representing "important", which is the information to be retained, is deleted as illustrated in FIG. 7E.

Figure 7F:
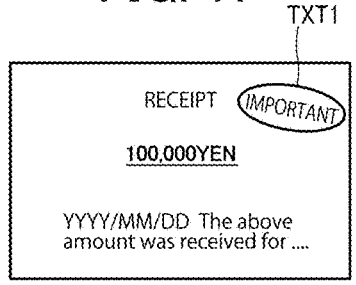

FIG. 7F illustrates a visible image of the document illustrated in FIG. 7D. In the image reading by the visible light emitted from the visible light source 2a, the text TXT1 representing "important" is not erased but remains as illustrated in FIG. 7F.

Figure 7G:
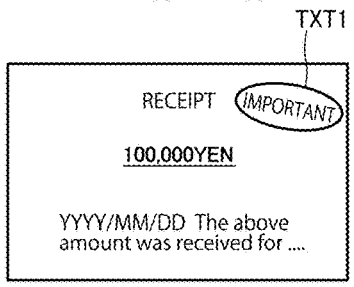

FIG. 7G illustrates the invisible image plus a restored image of the document illustrated in FIG. 7D. In the present embodiment, using the visible image (illustrated in FIG. 7F) acquired by the visible light image sensor 22a by reading with visible light, the first image restoration unit 21a restores the text TXT1 representing "important" in the invisible image acquired by the invisible light image sensor 22b. With such an image restoration process, the first image restoration unit 21a generates the first output image illustrated in FIG. 7G. This operation can prevent the information to be retained from being unintentionally lost.

As described above, the scanner 101 according to the present embodiment deletes unnecessary information in reading by invisible light, and, based on the visible image, supplements read information with image information that has been unintentionally deleted. Accordingly, the scanner 101 can accurately remove only unnecessary information without causing loss of other particular information or loss of characters. That is, while unnecessary information such as a background pattern and a stamp mark on a document are removed, information not to be removed can be restored. In addition, readability and OCR character recognition accuracy can be greatly improved.

A description is given of a second embodiment of the present disclosure.

The second embodiment differs from the first embodiment in that a general image sensor made of silicon is used as the invisible light image sensor 22b. In the following description of the second embodiment, descriptions of the same parts as those in the first embodiment are omitted, and differences from the first embodiment are described.

In the first embodiment, the scanner 101 includes the invisible light image sensor 22b that acquires an image in the invisible light wavelength range and the visible light image sensor 22a that acquires an image in the visible light wavelength range, respectively. However, the image sensor configuration is not limited thereto. As described above, when an infrared light source is used as the invisible light source 2b for reading the subject, it becomes possible to use an image sensor made of silicon having sensitivity in the infrared wavelength range.

Figure 8:
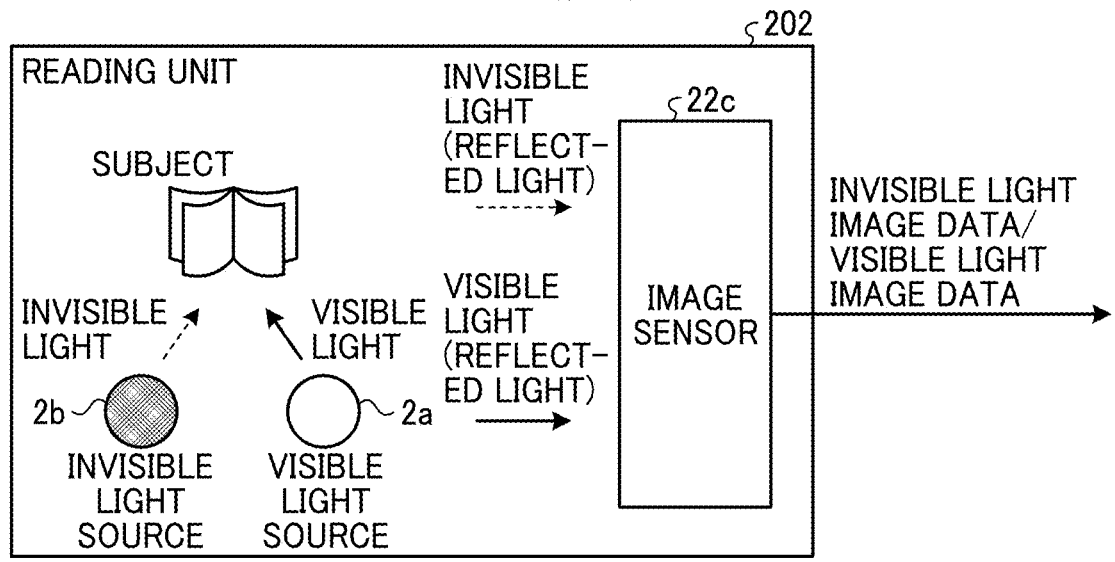
FIG. 8 is a diagram illustrating a configuration of a scanner according to a second embodiment.

FIG. 8 is a diagram illustrating the configuration of the reading unit 202 of the scanner 101 according to the second embodiment. As illustrated in FIG. 8, the scanner 101 includes a general silicon image sensor 22c of three liens of R, G, and B that serves as both the visible light image sensor 22a and the invisible light image sensor 22b.

Figure 9:
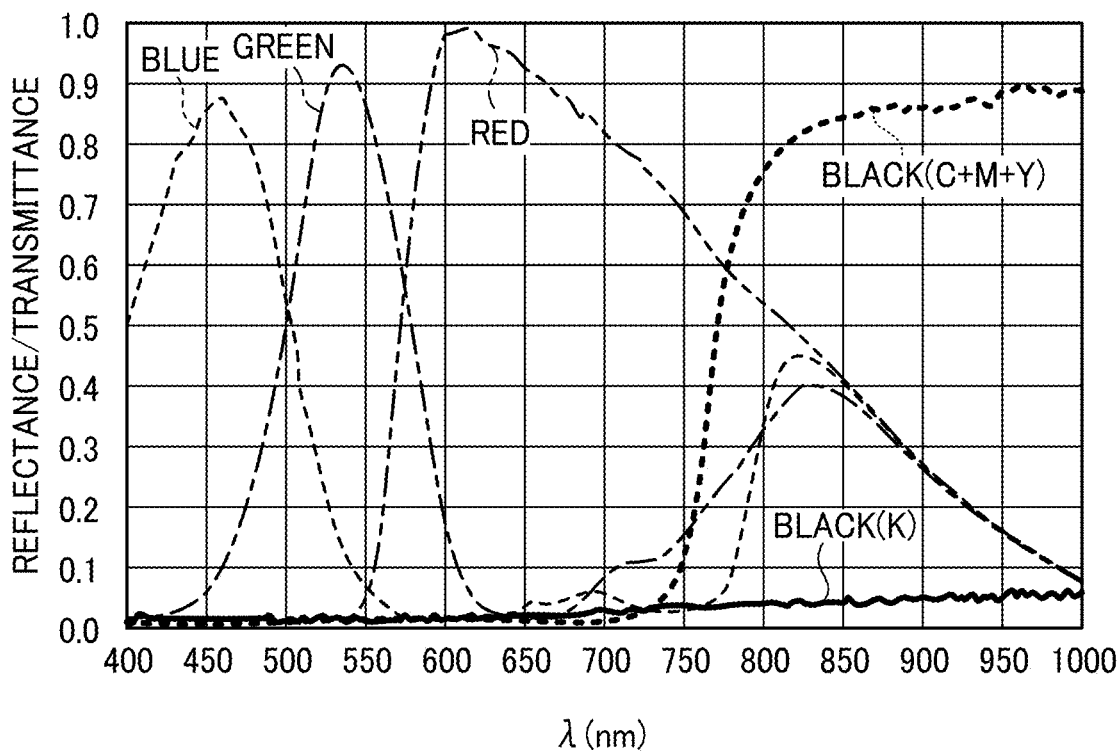
FIG. 9 is a graph of spectral sensitivity properties of an image sensor illustrated in FIG. 8.

FIG. 9 is a graph illustrating an example of the spectral sensitivity characteristics of the image sensor 22c illustrated in FIG. 8. As illustrated in FIG. 9, a general silicon image sensor has spectral sensitivity in the infrared wavelength range in addition to the visible wavelength ranges of blue, green, and red. For example, when infrared light is used as invisible light and white light is used as visible light, a general image sensor can be used as the visible light image sensor 22a and the invisible light image sensor 22b. Thus, the sensor configuration can be simplified, while reading of the invisible image and the visible image of the subject can be enabled.

The image sensor illustrated in FIG. 9 has sensitivity in both the visible light wavelength range and the invisible light wavelength range in each of the R, G, and B pixels. Therefore, in this configuration, when reading a subject, a visible image and an invisible image can be acquired by irradiation by either the visible light source 2a or the invisible light source 2b. At this time, the same image sensor can be used, and the sensor configuration are be simple.

Next, a description is given of a third embodiment.

The third embodiment is different from the first embodiment or the second embodiment in that a visible image is used as a determining factor for a restoration target for the invisible image. In the following description of the third embodiment, descriptions of the same parts as those in the first and second embodiments are omitted, and differences from the first or second embodiment are described.

Figure 10:
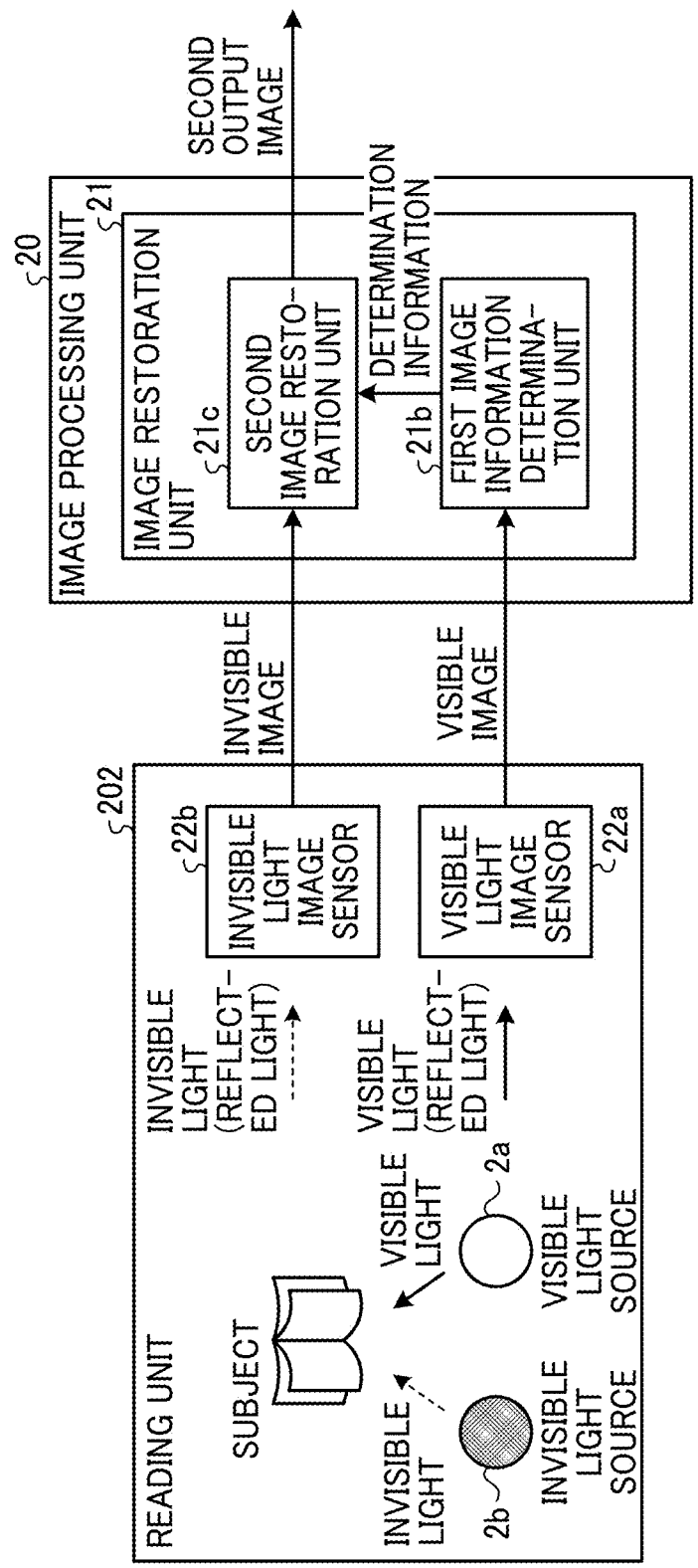
FIG. 10 is a block diagram illustrating a functional configuration of an image processing unit according to a third embodiment.

FIG. 10 is a block diagram illustrating a functional configuration of the image processing unit 20 according to the third embodiment. In the present embodiment, as illustrated in FIG. 10, the image restoration unit 21 includes a first image information determination unit 21b and a second image restoration unit 21c instead of the first image restoration unit 21a of the first embodiment.

The first image information determination unit 21b determines, based on a visible image, the information that should not be lost as information to be restored (restoration target), and generates a first determination result.

The second image restoration unit 21c generates a second output image in which the information lost in the invisible image is restored based on the first determination result.

Using a visible image as a determination factor for the restoration target to be restored in the invisible image in this way, an image that has unintentionally disappeared can be accurately restored.

The image restoration process executed by the image restoration unit 21 are described in detail below.

Figure 11A:
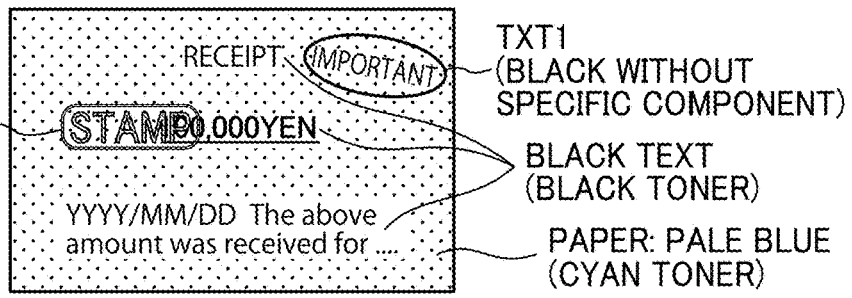
FIGS. 11A to 11E are diagrams illustrating an example of an image restoration process according to the third embodiment.

FIGS. 11A to 11E are diagrams illustrating an example of image restoration processing. FIG. 11A illustrates an example of a paper document printed on paper having a color (pale blue, etc.) background pattern. Specifically, characters (text) representing a date and an amount of money are printed with black toner containing a specific component such as carbon, and a receipt mark is stamped with red ink.

In addition, the text TXT1 representing "important" is added by handwriting at the upper right corner of the document illustrated in FIG. 11A, and the text TXT1 is written with the black material that is different from black toner and does not contain the specific component. The text TXT1 representing "important" is information indicating the importance and priority of the document, and disappearance is not desirable.

Figure 11B:
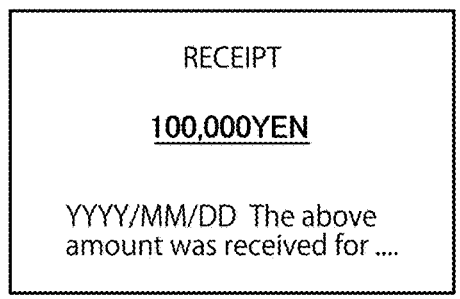

FIG. 11B illustrates an invisible image of the document illustrated in FIG. 11A. In the image reading by the invisible light emitted from the invisible light source 2b, the background pattern, the stamped mark of receipt, and the text TXT1 representing "important" are deleted, as illustrated in FIG. 11B.

Figure 11C:
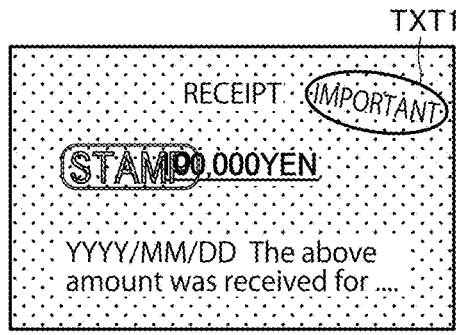

FIG. 11C illustrates a visible image of the document illustrated in FIG. 11A. In contrast to the image reading by invisible light, in the image reading by the visible light emitted from the visible light source 2a, the background pattern, the stamped mark of receipt, and the text TXT1 representing "important" are not erased but remain as illustrated in FIG. FIG. 11C.

Figure 11D:
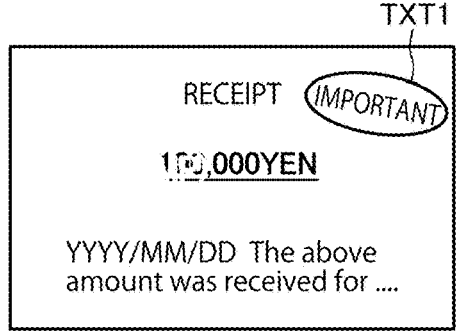

FIG. 11D illustrates determination information. The first image information determination unit 21b determines information that should not be lost from the visible image illustrated in FIG. 11C and generates the first determination result. Then, the first image information determination unit 21b outputs an image illustrated in FIG. 11D as the first determination result. FIG. 11D illustrates an example in which only black information of the image is extracted, for example.

A detailed description is given of the determination, by the first image information determination unit 21b, of whether or not the information is set as the restoration target. The first image information determination unit 21b determines, for example, whether or not at least one of hue and saturation is equal to or greater than a first threshold value, thereby determining the necessity of restoration of an image in an invisible image.

As illustrated in FIG. 3, the spectral reflection properties of a cyan (C) toner image, a magenta (M) toner image, and a yellow (Y) toner image formed on white paper are different in the visible wavelength range, and the C, M, and Y toner images are visually recognized as having different colors. Further, the black (CMY) toner produced by the composite of C toner, M toner, and Y toner exhibits low reflectance in the visible wavelength range (wavelength around 400 to 750 nm) and is recognized as black. In the near-infrared light range (wavelength 750 nm and greater), the black (CMY) toner exhibits high reflectance and is recognized as white. On the other hand, as illustrated in FIG. 3, the black (K) toner exhibits low reflectance over the entire wavelength range, and is recognized as black. That is, even though both colors are visually recognized as black, in the near-infrared wavelength range, the black (K) is read as black texts or images, but the black (CMY) is read as white and disappears as information.

Therefore, the first image information determination unit 21b of the present embodiment determines that the information determined as being "black" is "information that is unintentionally going to disappear" based on information of at least one of hue and saturation contained in the visible image.

The "information that is unintentionally going to disappear" determined in this way is used for restoring information by, for example, adding, correcting, or replacing information to the invisible image, using the corresponding visible image. Even when the "information that is unintentionally going to disappear" is black (K) information, there is no effect because an additional process is performed to the information that has not been lost.

This configuration enables accurate detection of an image that may be unintentionally lost.

Figure 11E:
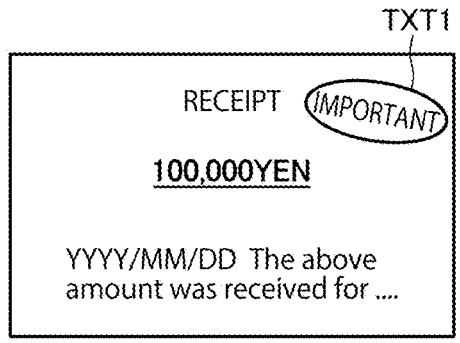

FIG. 11E illustrates the invisible image plus a restored image of the document illustrated in FIG. 11A. In the present embodiment, the second image restoration unit 21c performs OCR for, for example, each image, using the invisible image illustrated in FIG. 11B and the determination information illustrated in FIG. 11D. Accordingly, the scanner 101 can acquire the restored image illustrated in FIG. 11E as a second output image. This configuration enables restoration of an image that may be unintentionally lost while removing unnecessary information.

As described above, according to the present embodiment, using the image information of the visible image as a determination factor for a restoration target to be restored in the invisible image, an image that may be unintentionally lost can be accurately detected and restored.

Note that the first image information determination unit 21b determines whether or not at least one of hue and saturation is equal to or greater than the first threshold value so as to determine the information that should not to be lost based on the visible image, as the basis for determining the necessity of restoration of an image in an invisible image. However, the basis of this determination is not limited thereto. For example, the first image information determination unit 21b may determine whether the information is either black, which has low brightness, or gray, which has low brightness and low saturation, as the basis of this determination.

Figure 12A:
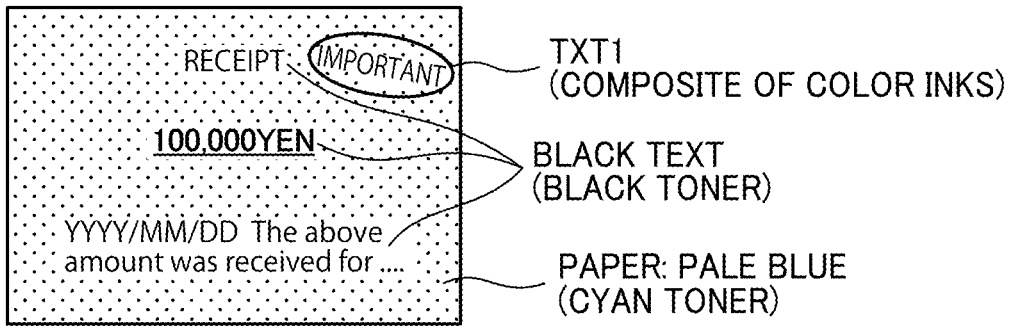
FIGS. 12A and 12B are diagrams illustrating another example of the image restoration process according to the third embodiment.
Figure 12B:
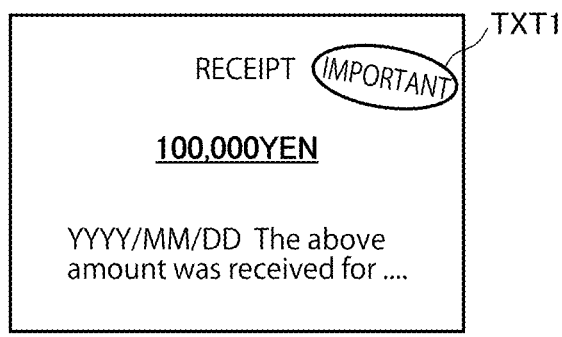

FIGS. 12A and 12B are diagrams illustrating another example of the image restoration process. FIG. 12A illustrates an example of a paper document printed on paper having a color (pale blue, etc.) background pattern. Specifically, characters (texts) representing a date and an amount of money are printed with black toner containing a specific component such as carbon.

In addition, the text TXT1 representing "important" is added by handwriting at the upper right corner of the document illustrated in FIG. 12A, and the text TXT1 is written with a black material which is different from black toner and does not contain a specific component. The text TXT1 representing "important" is information indicating the importance and priority of the document, and disappearance is not desirable.

The text TXT1 representing "important", which is printed in black by color ink composition, is erased in the image reading by the invisible light emitted from the invisible light source $2b$ but is restored by the restoration process according to the present disclosure. The color background pattern of the paper (pale blue, etc.) is not restored because the color background pattern has hue and saturation equal to or higher than the threshold. As a result, as illustrated in FIG. 12B, only the background pattern is removed, and a restored image thus obtained is a second output image whose recognizability is significantly improved.

This configuration enables accurate detection of an image that may be unintentionally lost.

Next, a description is given of a fourth embodiment.

The fourth embodiment is different from the first embodiment to the third embodiment in that both a visible image and an invisible image are used as the determining factors for a restoration target for the invisible image. In the following description of the fourth embodiment, descriptions of the same parts as those in the first to third embodiments are omitted, and differences from the first to third embodiment are described.

Figure 13:
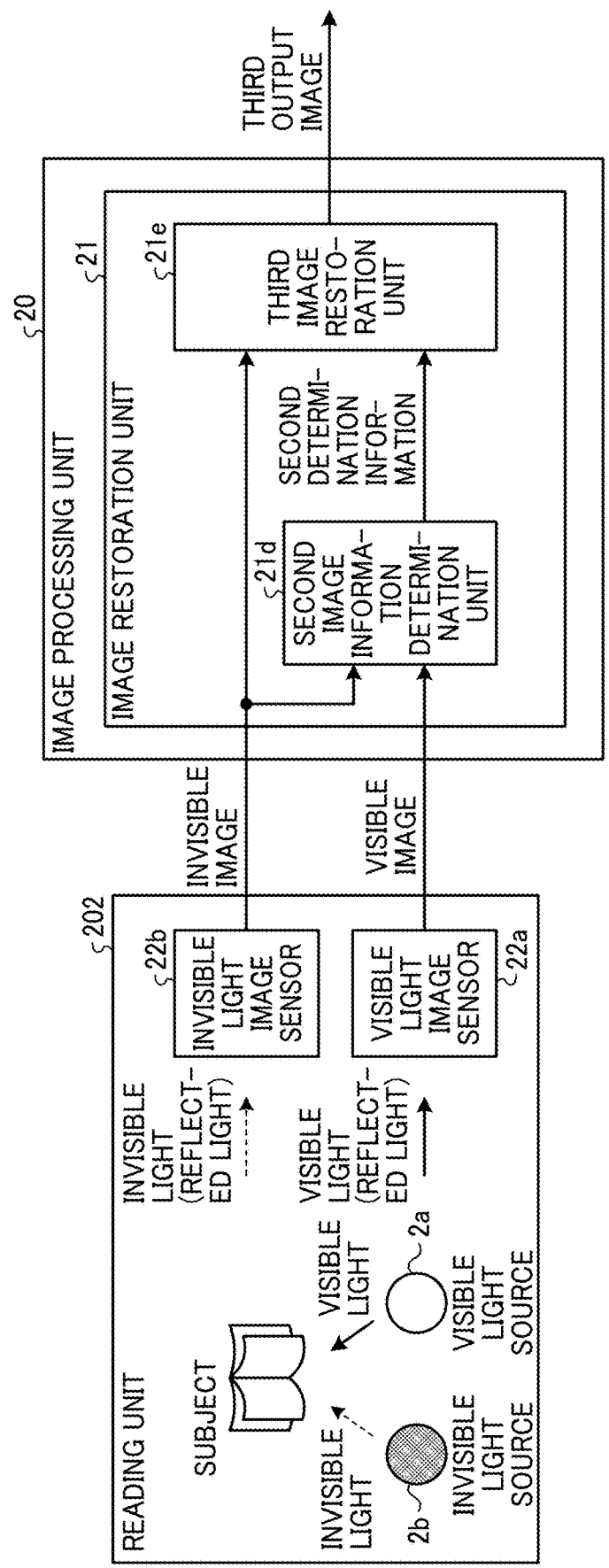
FIG. 13 is a block diagram illustrating a functional configuration of an image processing unit according to a fourth embodiment.

FIG. 13 is a block diagram illustrating a functional configuration of the image processing unit 20 according to the fourth embodiment.

As illustrated in FIG. 13, the image restoration unit 21 of the present embodiment includes a second image information determination unit $21d$ and a third image restoration unit $21e$, instead of the first image restoration unit $21a$ described in the first embodiment.

The second image information determination unit $21d$ determines, as the restoration target, the information that should not be lost based on a visible image and an invisible image, and generates a second determination result.

The third image restoration unit $21e$ restores the information lost in the invisible image based on the second determination result generated by the second image information determination unit $21d$, and generates a third output image.

Using the visible image and the invisible image as the determination factors for a restoration target to be restored in an invisible image in this way, an image that may be unintentionally lost can be restored accurately. Further, the data amount in the image restoration process can smaller.

The image restoration process executed by the image restoration unit 21 are described in detail below.

Figure 14A:
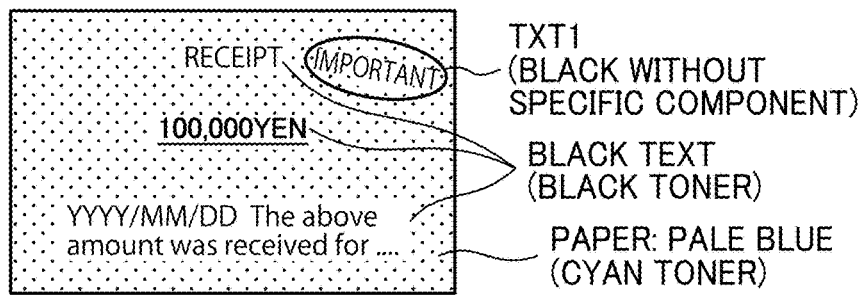
FIGS. 14A to 14E are diagrams illustrating an example of an image restoration process according to the fourth embodiment.

FIGS. 14A to 14E are diagrams illustrating an example of the image restoration process according to the fourth embodiment. FIG. 14A illustrates an example of a paper document printed on paper having a color (pale blue, etc.) background pattern. Specifically, characters (text) representing a date and an amount of money are printed with black toner containing a specific component such as carbon.

In addition, the text TXT1 representing "important" is added by handwriting at the upper right corner of the document illustrated in FIG. 14A, and the text TXT1 is written with the black material that is different from black toner and does not contain the specific component. The text TXT1 representing "important" is information indicating the importance and priority of the document, and disappearance is not desirable.

Figure 14B:
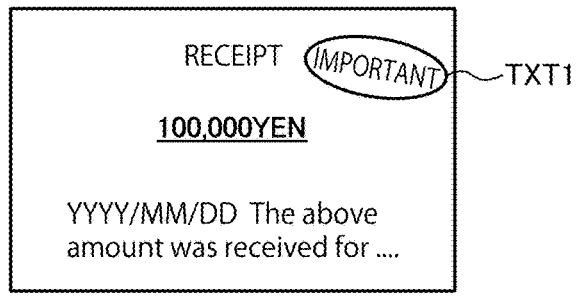

FIG. 14B illustrates an invisible image of the document illustrated in FIG. 14A. In the image reading by the invisible light emitted from the invisible light source $2b$, the background pattern and the text TXT1 representing "important" are deleted, as illustrated in FIG. 14B.

Figure 14C:
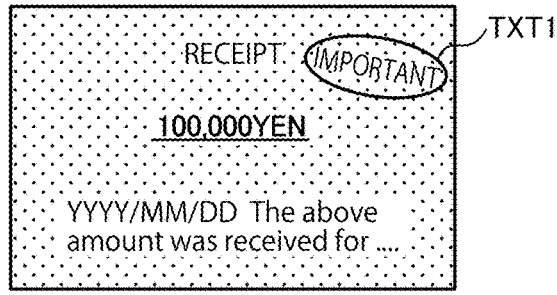

FIG. 14C illustrates a visible image of the document illustrated in FIG. 14A. In contrast to the image reading by the invisible light, in the image reading by the visible light emitted from the visible light source $2a$, the background pattern and the text TXT1 representing "important" are not erased but remain as illustrated in FIG. FIG. 14C.

Figure 14D:
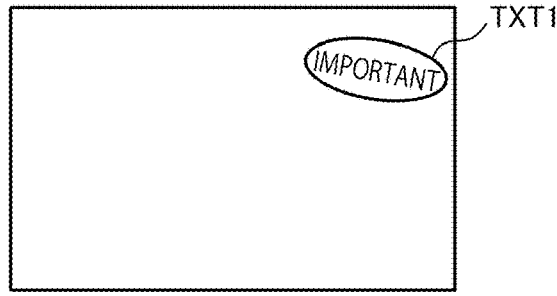

FIG. 14D illustrates determination information. Using the invisible image illustrated in FIG. 14B and the visible image illustrated in FIG. 14C, the second image information determination unit $21d$ extracts, for example, information that is black and is not common to the two images. Then, the second image information determination unit $21d$ determines the black and non-common portion as the information that should not be lost, and generates a second determination result. Then, the second image information determination unit $21d$ outputs an image illustrated in FIG. 14D as the second determination result. FIG. 14D illustrates an example in which, for example, the information that is black and not common to the two images is extracted. The image illustrated in FIG. 14D that is output as the determination information includes a smaller amount of information than the example of FIG. 11D.

A detailed description is given of the determination, by the second image information determination unit $21d$, of whether or not the information is set as the restoration target. The second image information determination unit $21d$ determines whether or not at least one of hue and saturation is equal to or greater than the first threshold value, so as to determine the information that should not to be lost based on the invisible image and the visible image, for determining the necessity of restoration of an image in the invisible image. Specifically, the second image information determination unit $21d$ determines that the information determined as being "black" is "information that is unintentionally going to disappear" based on information of at least one of hue and saturation contained in the visible image.

The "information that is unintentionally going to disappear" determined in this way is used for restoring information by, for example, adding information to the invisible image, correcting the invisible image, or replacing information in the invisible image, using the corresponding visible image. Even when the "information that is unintentionally going to disappear" is black (K) information, there is no effect because an additional process is performed to the information that has not been lost.

This configuration enables accurate detection of an image that may be unintentionally lost.

Figure 14E:
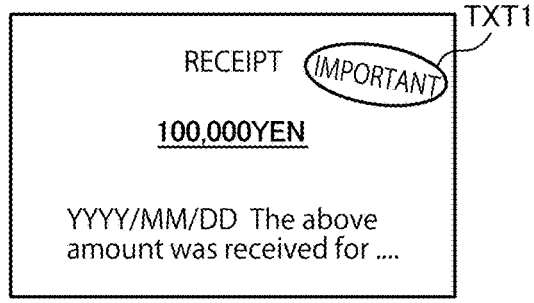

FIG. 14E illustrates the invisible image plus a restored image of the document illustrated in FIG. 14A. In the present embodiment, the third image restoration unit $21e$ performs OCR for, for example, each image, using the invisible image illustrated in FIG. 14B and the determination information illustrated in illustrated in FIG. 14D. Accordingly, the scanner 101 can acquire the restored image illustrated in FIG. 14E as a third output image. This configuration enables restoration of an image that may be unintentionally lost while removing unnecessary information. Further, the determination information can have a smaller data amount.

As described above, according to the present embodiment, using the visible image the invisible image as the determination factors for the restoration target to be restored in the invisible image, an image that may be unintentionally lost can be more accurately detected and restored.

Note that the second image information determination unit 21*d* determines whether or not at least one of hue and saturation is equal to or greater than the first threshold value so as to determine the necessity of restoration of the image in the invisible image. However, the basis of this determination is not limited thereto. For example, the second image information determination unit 21*d* may determine whether the information is either black, which has low brightness, or gray, which has low brightness and low saturation, as the basis of this determination.

A description is given of a fifth embodiment of the present disclosure.

The fifth embodiment is different from the first to fourth embodiments in that the color designated by the user is restored. In the following description of the fifth embodiment, descriptions of the same parts as those in the first to fourth embodiments are omitted, and differences from the first to fourth embodiment are described.

Figure 15:
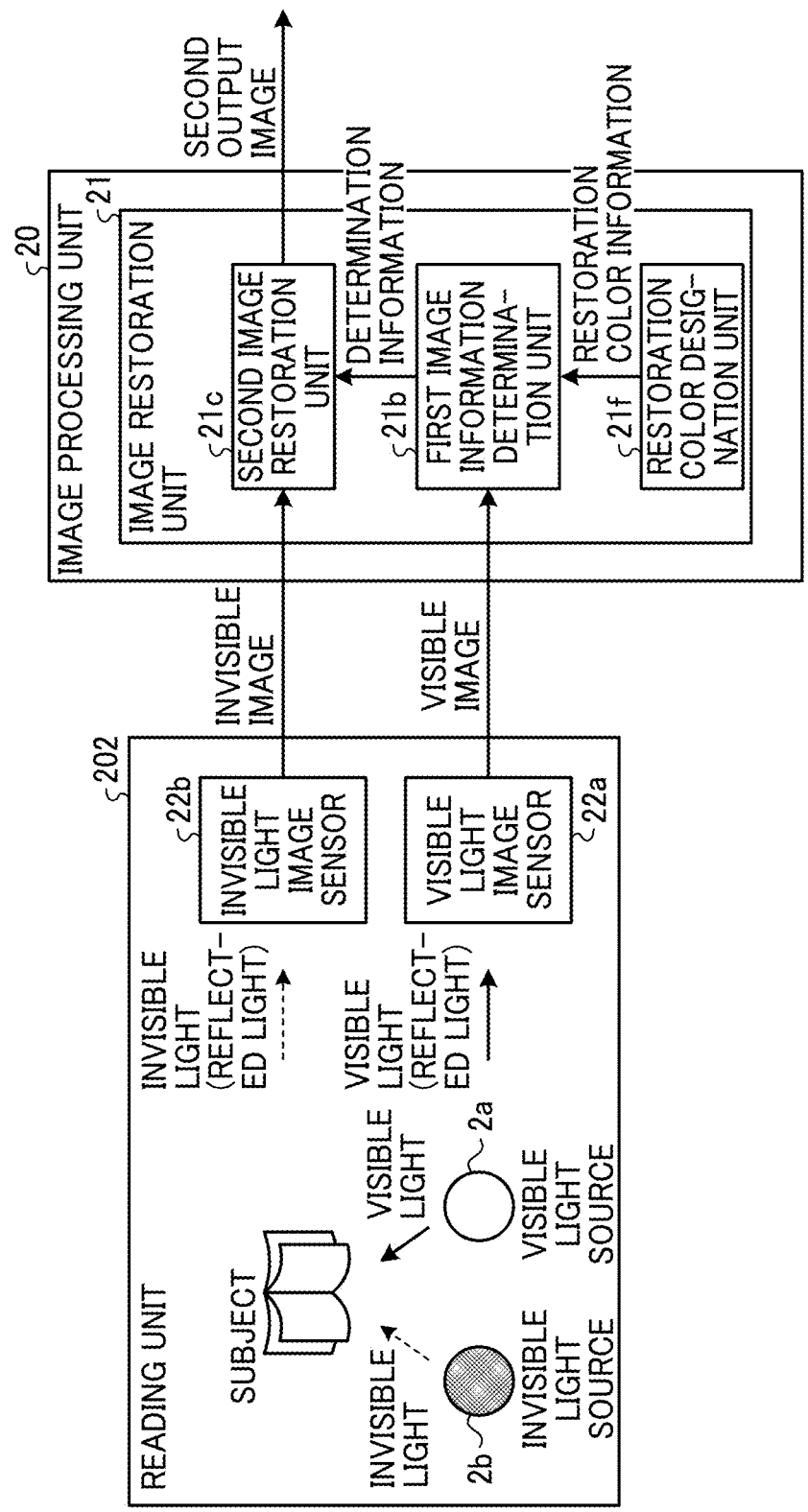
FIG. 15 is a block diagram illustrating a functional configuration of an image processing unit according to a fifth embodiment.

FIG. 15 is a block diagram illustrating a functional configuration of the image processing unit 20 according to the fifth embodiment.

As illustrated in FIG. 15, the image restoration unit 21 of the present embodiment further includes a restoration color designation unit 21*f* for an invisible image in addition to the configuration illustrated in FIG. 10.

The restoration color designation unit 21*f* enables freely changing information or image to be restored by the image restoration unit 21, thereby preventing the loss of important information of any color (such as a vermilion imprint or a receipt sign with a color pen).

More specifically, the restoration color designation unit 21*f* enables freely changing the first threshold value when the first image information determination unit 21*b* determines whether or not at least one of hue and saturation is equal to or higher than the first threshold value. Further, the restoration color designation unit 21*f* enables freely changing the color between black and gray when the first image information determination unit 21*b* determines whether the information is either black, which has low brightness, or gray, which has low brightness and low saturation, as the basis of this determination.

The color designated by the restoration color designation unit 21*f* may be automatically designated by the controller 23, or the restoration color designation unit 21*f* may be configured so that a user can freely designate a color.

Figure 16A:
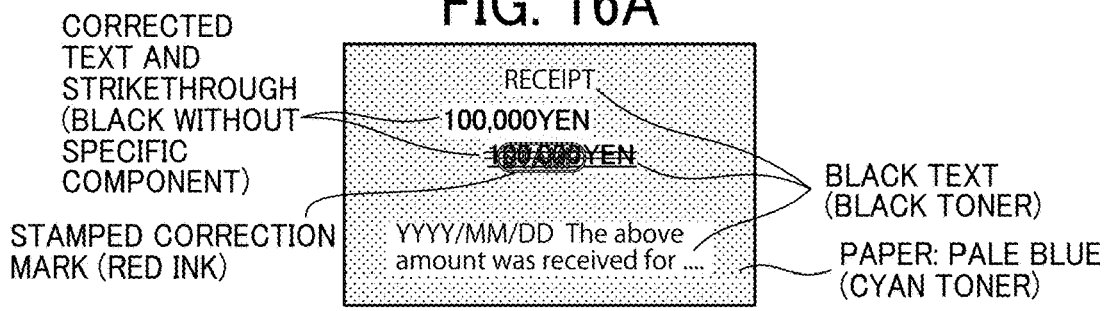
FIGS. 16A to 16F are diagrams illustrating an example of an image restoration process according to the fifth embodiment.

FIGS. 16A to 16F are diagrams illustrating an example of the image restoration process. FIG. 16A illustrates a document in which a date and an amount of money are printed, with black toner containing a specific component such as carbon, on paper having a color background pattern. Further, on the document illustrated in FIG. 16A, a strikethrough deleting the amount and corrected characters are written with a black material that is different from black toner and does not contain the specific component. In addition, a red correction mark is stamped (e.g., red ink). In this document, the information except the background pattern is necessary information, and losing such information is not desirable.

Figure 16B:
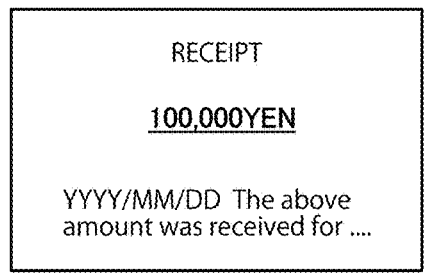

FIG. 16B illustrates an invisible image of the document illustrated in FIG. 16A. In the image reading by the invisible light emitted from the invisible light source 2*b*, in addition to the background pattern and the stamped mark of receipt, the necessary information, that is, the strikethrough and the corrected characters are deleted as illustrated in FIG. 16B.

Figure 16C:
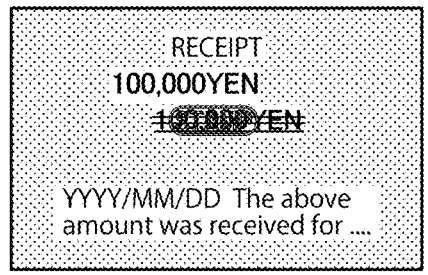

FIG. 16C illustrates a visible image of the document illustrated in FIG. 16A. In contrast to the image reading by the invisible light, in the image reading by the visible light emitted from the visible light source 2*a*, the background pattern, the stamped mark of receipt, and the necessary information (the strikethrough and the corrected characters) are not erased but remain as illustrated in FIG. 16C.

In this example, it is assumed that the restoration color designation unit 21*f* designates, for example, black and red as restoration colors. When designating black and red as the restoration colors in the restoration color designation unit 21*f*, the restoration color designation unit 21*f* instructs the first image information determination unit 21*b* to retain or restore black and red information.

Figure 16D:
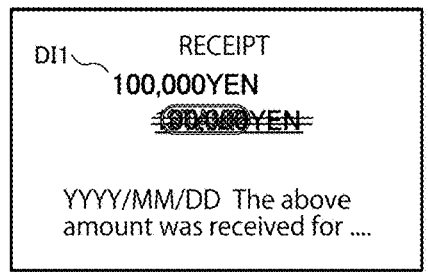

FIG. 16D illustrates determination information DI1. As illustrated in FIG. 16D, in response to the instruction of designation of black and red as the restoration colors, the first image information determination unit 21*b* extracts, using the visible image illustrated in FIG. 16C, black information and red information as the determination information DI1 illustrated in FIG. 16D. Then, the first image information determination unit 21*b* outputs the determination information DI1 as the first determination result.

Figure 16E:
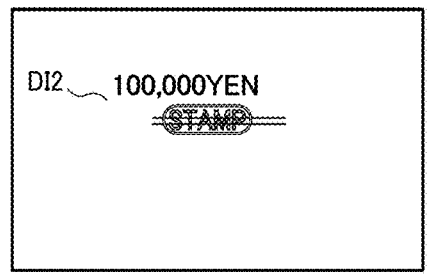

FIG. 16E illustrates determination information DI2. In response to the instruction of designation of black and red as the restoration colors, the first image information determination unit 21*b* removes, from the determination information DI1 illustrated in FIG. 16D, the invisible image illustrated in FIG. 16B. Then, the first image information determination unit 21*b* outputs the determination information DI2 illustrated in FIG. 16E as the first determination result.

Figure 16F:
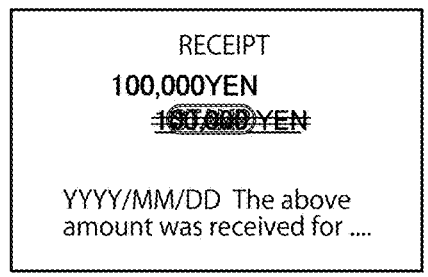

FIG. 16F illustrates an invisible image plus a restored image of the document illustrated in FIG. 16A. In the present embodiment, the second image restoration unit 21*c* performs OCR for, for example, each image, using a) the determination information DI1 illustrated in FIG. 16D, b) the invisible image illustrated in FIG. 16B and the determination information DI1 illustrated in FIG. 16D, or c) the invisible image illustrated in FIG. 16B and the determination information DI2 illustrated in FIG. 16E. As a result, the restored image illustrated in FIG. 16F can be obtained. This configuration enables restoration of a given color image that may be unintentionally lost while removing unnecessary information.

Thus, according to the present embodiment, the controller 23 or the user can freely change the color to be restored, and accordingly, the loss of important information of a color (such as a vermilion imprint or a receipt sign with a color pen).

Figure 17:
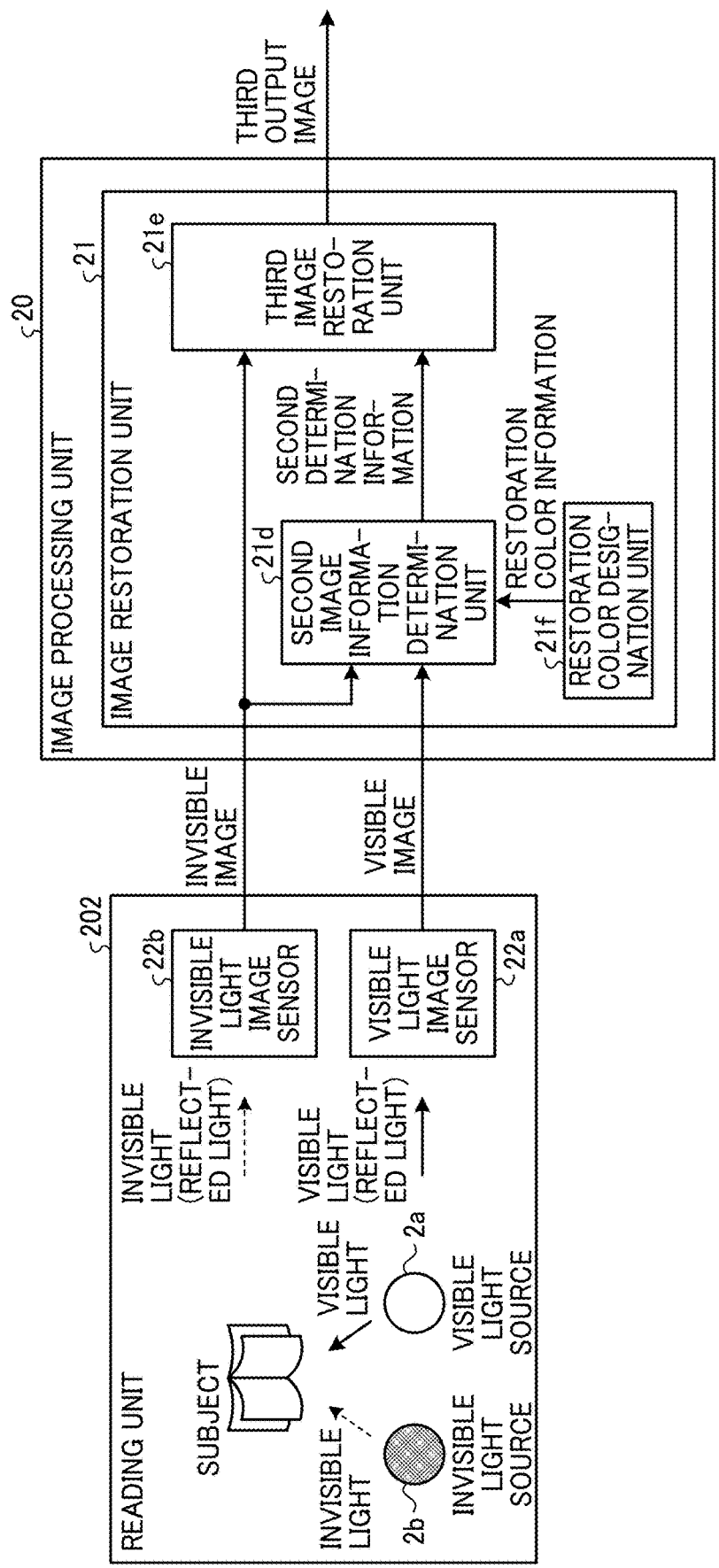
FIG. 17 is a block diagram illustrating a modified example of the functional configuration of the image processing unit illustrated in FIG. 13 or 15.

In the present embodiment, the description has been given of an example of adding the restoration color designation unit 21*f* for the invisible image to the configuration illustrated in FIG. 10, but the present disclosure is not limited thereto. FIG. 17 is a block diagram illustrating a modified example of the functional configuration of the image processing unit 20. As illustrated in FIG. 17, the image restoration unit 21 may include the restoration color designation unit 21*f* for an invisible image in addition to the configuration illustrated in FIG. 13.

This configuration also enables restoration of a given color image that may be unintentionally lost while removing unnecessary information.

Next, a sixth embodiment is described.

The sixth embodiment is different from the first embodiment to the fifth embodiment in that a visible image is also output to the outside. In the following description of the sixth embodiment, descriptions of the same parts as those in the first to fifth embodiments are omitted, and differences from the first to fifth embodiment are described.

Each of the above-described embodiments concerns the configuration to restore or correct the disappeared information and image in the invisible image and output the corrected image as the first output image or the second output image.

In the present embodiment, a visible image can be output to the outside. With this configuration, for example, a state before restoration or correction according to the present disclosure, that is, a visual recognition image of a received or processed document can be used for storing, confirmation, or evidence.

Figure 18:
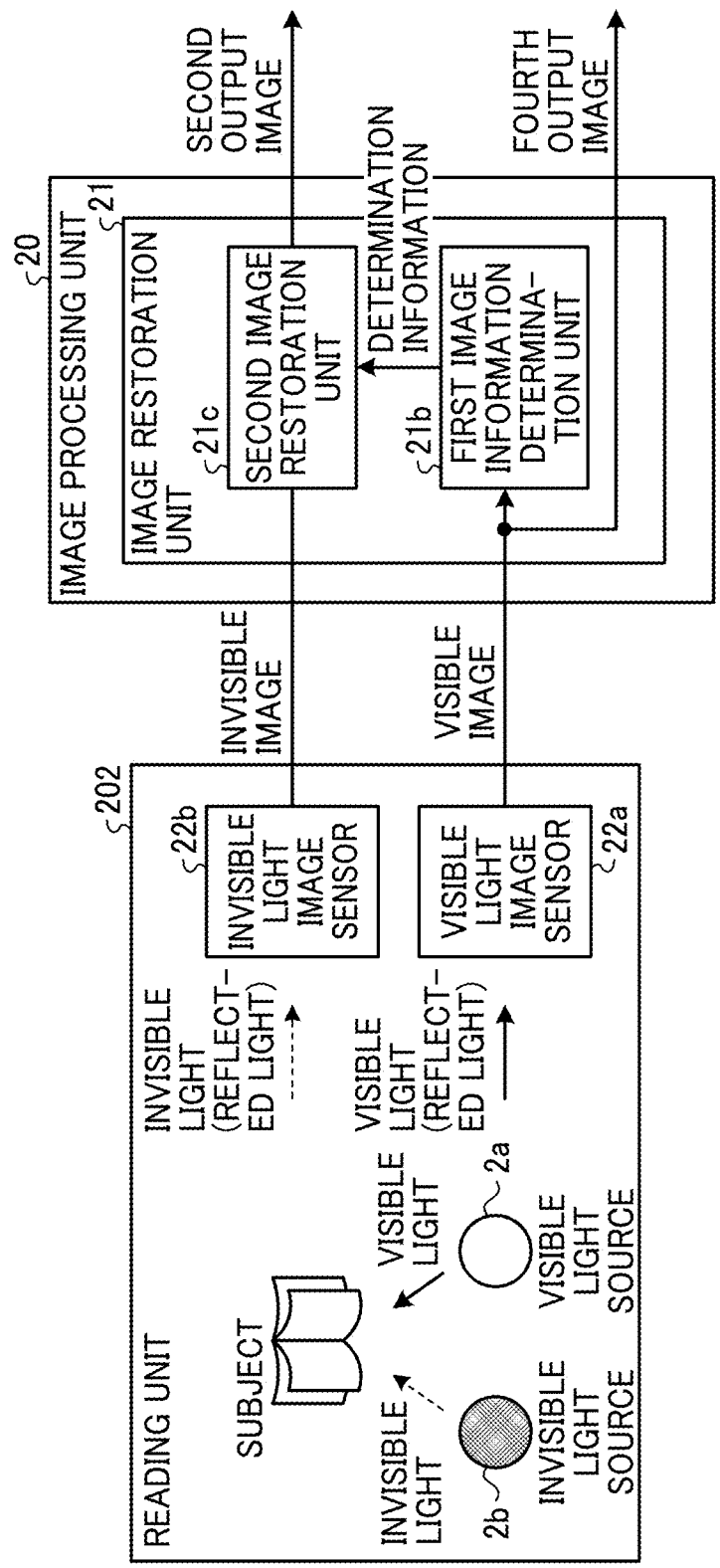
FIG. 18 is a block diagram illustrating a functional configuration of an image processing unit according to a sixth embodiment.

FIG. 18 is a block diagram illustrating a functional configuration of the image processing unit 20 according to the sixth embodiment. As illustrated in FIG. 18, the image restoration unit 21 of the present embodiment further outputs a visible image as a fourth output image in the configuration illustrated in FIG. 10.

According to the application example described with reference to FIGS. 11A to 11E, the restored image illustrated in FIG. 11E is finally output as the second output image. However, strictly speaking, the background pattern has been removed from the original document illustrated in FIG. 11A. Accordingly, although the second output image is suitable for OCR and readability improvement, for example, the admissibility as an evidence and legal handling of the document may not be sufficient.

Therefore, the image restoration unit 21 of the present embodiment can output the original image which is a visible image of the document of FIG. 11C, so as to supplement and eliminate insufficiency of such effects.

As described above, according to the present embodiment, in addition to the invisible light corrected image, the visible image can be used for storing, confirmation, evidence, or the like.

Figure 19:
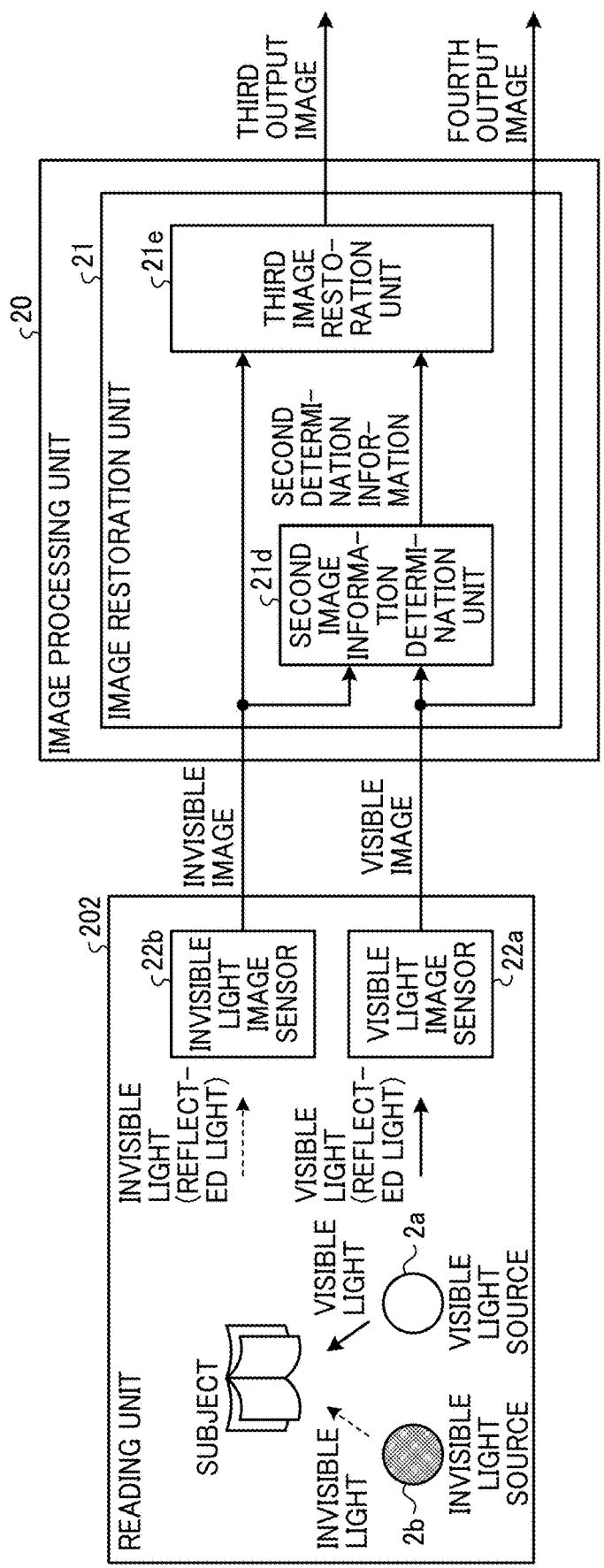
FIG. 19 is a block diagram illustrating a modified example of the functional configuration of the image processing unit illustrated in FIG. 13 or 18.

In the present embodiment, the description has been given of an example of the configuration to output a visible image as a fourth output image in the configuration illustrated in FIG. 10, but the present disclosure is not limited thereto. FIG. 19 is a block diagram illustrating a modified example of the functional configuration of the image processing unit 20. As illustrated in FIG. 19, the image restoration unit 21 may further output a visible image as a fourth output image in the configuration illustrated in FIG. 13.

Even in such a case, since the original image which is a visible image of the document can be output, the above-mentioned insufficiency of effects can be supplemented and eliminated.

Note that in the embodiments described above, the image processing apparatus is applied to a multifunction peripheral having at least two of copying, printing, scanning, and facsimile functions. Alternatively, the image processing apparatus may be applied to, e.g., a copier, a printer, a scanner, or a facsimile machine.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. An image processing apparatus comprising:
an invisible light source configured to emit invisible light to a subject;
a visible light source configured to emit visible light to the subject;
an invisible image reading sensor configured to read invisible reflection light reflected from the subject to acquire an invisible image, the invisible reflection light being a part of the invisible light emitted from the invisible light source;
a visible image reading sensor configured to read visible reflection light reflected from the subject to acquire a visible image, the visible reflection light being a part of the visible light emitted from the visible light source; and
circuitry configured to:
restore information lost in the invisible image acquired by the invisible image reading sensor;
determine information to be retained, as a restoration target, based on the visible image and output a determination result indicating the restoration target; and
generate an output image in which the information lost in the invisible image is restored based on the determination result.

2. The image processing apparatus according to claim 1, wherein the circuitry is configured to determine, as the information to be retained, information having at least one of a hue value and a saturation value equal to or higher than a threshold value.

3. The image processing apparatus according to claim 2, wherein the circuitry is configured to change the threshold value.

4. The image processing apparatus according to claim 1, wherein the circuitry is configured to determine, as the information to be retained, information having a particular color that is either black or gray.

5. The image processing apparatus according to claim 2, wherein the circuitry is configured to change the particular color between black and gray.

6. The image processing apparatus according to claim 1, wherein the invisible light source is configured to emit infrared light as the invisible light.

7. The image processing apparatus according claim 1, wherein the visible image reading sensor is integral with the invisible image reading sensor.

8. The image processing apparatus according to claim 1, wherein the circuitry is configured to output the visible image.

9. An image processing apparatus comprising:
an invisible light source configured to emit invisible light to a subject;
a visible light source configured to emit visible light to the subject;
an invisible image reading sensor configured to read invisible reflection light reflected from the subject to acquire an invisible image, the invisible reflection light being a part of the invisible light emitted from the invisible light source;

a visible image reading sensor configured to read visible reflection light reflected from the subject to acquire a visible image, the visible reflection light being a part of the visible light emitted from the visible light source; and circuitry configured to:

restore information lost in the invisible image acquired by the invisible image reading sensor;

determine information to be retained, as a restoration target, based on the invisible image and the visible image and output a determination result indicating the restoration target; and generate an output image in which the information lost in the invisible image is restored based on the determination result.

10. The image processing apparatus according to claim 9, wherein the circuitry is configured to determine, as the information to be retained, information having a particular color that is either black or gray.

11. The image processing apparatus according to claim 10, wherein the circuitry is configured to change the particular color between black and gray.

12. The image processing apparatus according to claim 9, wherein the circuitry is configured to determine, as the information to be retained, information having at least one of a hue value and a saturation value equal to or higher than a threshold value.

13. The image processing apparatus according to claim 12, wherein the circuitry is configured to change the threshold value.

14. The image processing apparatus according to claim 9, wherein the invisible light source is configured to emit infrared light as the invisible light.

15. The image processing apparatus according to claim 9, wherein the visible image reading sensor is integral with the invisible image reading sensor.

16. An image processing apparatus comprising:

an invisible light source configured to emit invisible light to a subject;

a visible light source configured to emit visible light to the subject;

an invisible image reading sensor configured to read invisible reflection light reflected from the subject to acquire an invisible image, the invisible reflection light being a part of the invisible light emitted from the invisible light source;

a visible image reading sensor configured to read visible reflection light reflected from the subject to acquire a visible image, the visible reflection light being a part of the visible light emitted from the visible light source; and circuitry configured to restore information lost in the invisible image acquired by the invisible image reading sensor, wherein the visible image reading sensor includes three reading pixel rows of:

a red pixel row sensitive to at least a red visible wavelength range;

a green pixel row sensitive to at least a green visible wavelength range; and a blue pixel row sensitive to at least a blue visible wavelength range, and wherein the invisible image reading sensor is configured to use a range of at least a portion of the red pixel row, the green pixel row, and the blue pixel row, the range being sensitive to an invisible light wavelength.

17. The image processing apparatus according to claim 16, wherein the invisible light source is configured to emit infrared light as the invisible light.

18. The image processing apparatus according claim 16, wherein the visible image reading sensor is integral with the invisible image reading sensor.

19. An image processing apparatus comprising:

an invisible light source configured to emit invisible light to a subject;

a visible light source configured to emit visible light to the subject;

an invisible image reading sensor configured to read invisible reflection light reflected from the subject to acquire an invisible image, the invisible reflection light being a part of the invisible light emitted from the invisible light source;

a visible image reading sensor configured to read visible reflection light reflected from the subject to acquire a visible image, the visible reflection light being a part of the visible light emitted from the visible light source; and circuitry configured to restore information lost in the invisible image acquired by the invisible image reading sensor, wherein the visible image reading sensor includes three reading pixel rows of:

a red pixel row sensitive to at least a red visible wavelength range;

a green pixel row sensitive to at least a green visible wavelength range; and a blue pixel row sensitive to at least a blue visible wavelength range, and wherein the invisible image reading sensor includes a pixel row sensitive to an invisible light wavelength range.

20. The image processing apparatus according to claim 19, wherein the invisible light source is configured to emit infrared light as the invisible light.

* * * * *